(12) United States Patent
Bolt

(10) Patent No.: US 11,341,693 B1
(45) Date of Patent: May 24, 2022

(54) STROKE TAPESTRY METHODS AND SYSTEMS

(71) Applicant: COREL CORPORATION, Ottawa (CA)

(72) Inventor: Stephen Bolt, Stittsville (CA)

(73) Assignee: Corel Corporation, Ottawa (CA)

( * ) Notice: Subject to any disclaimer, the term of this patent is extended or adjusted under 35 U.S.C. 154(b) by 0 days.

(21) Appl. No.: 17/323,573

(22) Filed: May 18, 2021

(51) Int. Cl.
*G06T 11/20* (2006.01)
*G06T 11/40* (2006.01)

(52) U.S. Cl.
CPC ............ *G06T 11/203* (2013.01); *G06T 11/40* (2013.01); *G06T 2200/24* (2013.01)

(58) Field of Classification Search
None
See application file for complete search history.

(56) References Cited

U.S. PATENT DOCUMENTS

2007/0216684 A1* 9/2007 Hsu .................... G06T 11/60
345/441

OTHER PUBLICATIONS

Inkscape (Inkscape sub-stich path, link: https://www.youtube.com/watch?v=8EQxEFrHJEc, dated Nov. 30, 2020; hereinafter Inkscape1) (Year: 2020).*
Andler et al. (Authors:Josh Andler; Ryan Lerch; Colin Marquardt; Kris De Gussem; Nicolas Dufour; Sylvain Chiron; Gellért Gyuris, Header / footerdesign: Esteban Capella—2019; link: https://inkscape.org/doc/tutorials/interpolate/tutorial-interpolate.html; (Year: 2019).*

* cited by examiner

*Primary Examiner* — Nurun N Flora
(74) *Attorney, Agent, or Firm* — Rosenberg, Klein & Lee

(57) ABSTRACT

Prior art digital painting applications create strokes by repeatedly applying a stamp at incremental positions along a path. Such applications led to uniform marks being made by the mark making tool along the stroke as the same process as applied by the software application at each point along the stroke. However, some areas of a painting involve repetitive strokes, which can take a lot of time for the user. Embodiments of the invention provide the user with automated methods and systems that maintain a level of control the user seeks or needs whilst removing the repetitive nature of the area filling thereby saving the user time whilst delivering high quality results. The invention fills the area to be filled to painted with actual, individual strokes, offering the advantages of overlapping strokes and mixing paint for an increased "natural" media look and feel. Additionally, the user is able to either specify parameters for the process in advance or to sculpt/tune the result as the software application paints.

10 Claims, 22 Drawing Sheets

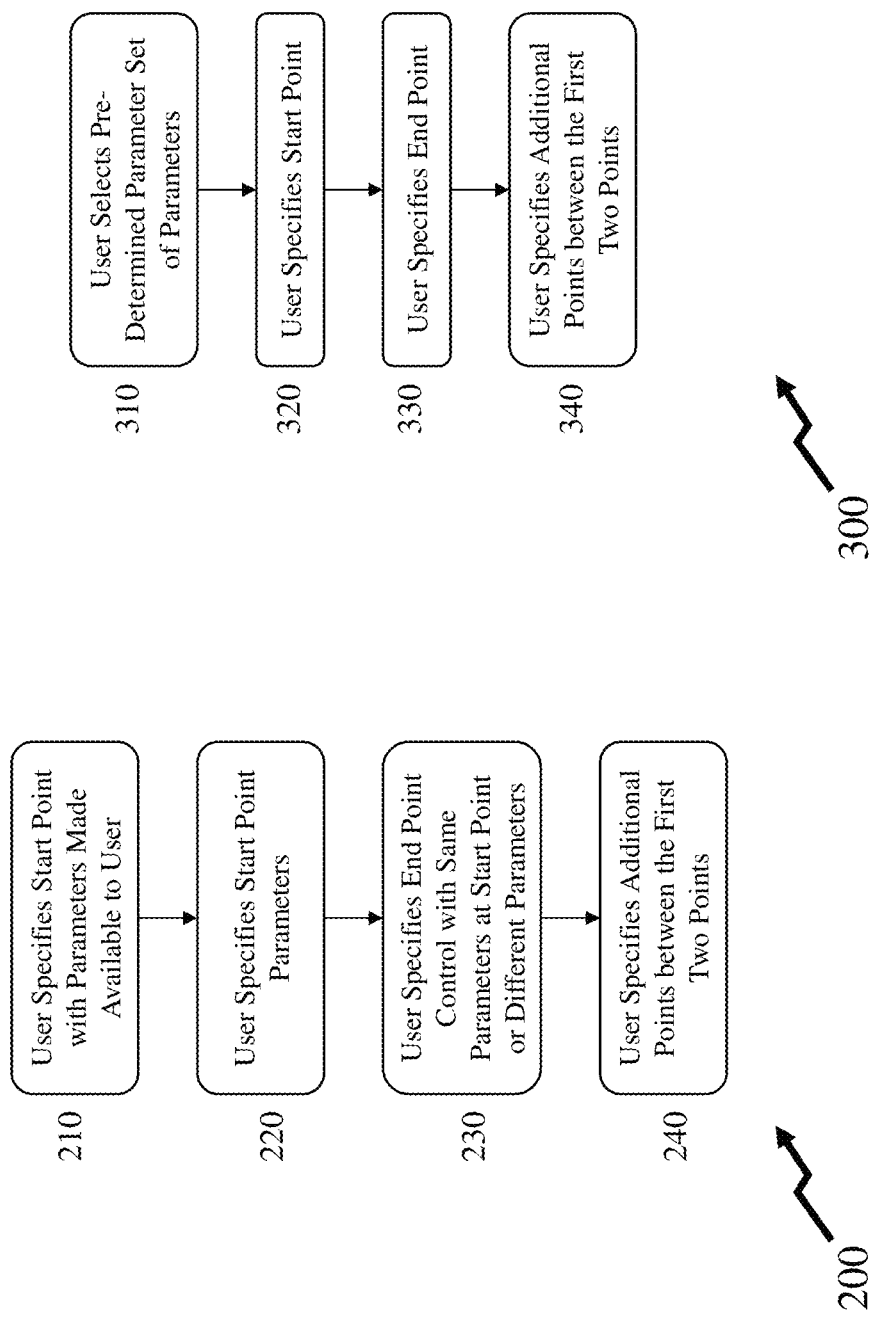

STROKE TAPESTRY METHODS AND SYSTEMS

FIELD OF THE INVENTION

This invention relates to digital imagery and more particularly to reducing repetitive strokes for filling an area by providing brush stroke tools, or mark making tools, that automatically fill the area with natural looking brush strokes.

BACKGROUND OF THE INVENTION

An operation often provided by digital graphics and digital image editors is the use of a virtual "paintbrush" (also referred to herein as a "brush", "brush tool", or mark making tool) to modify a digital image by depositing virtual paint or virtual ink. Various prior approaches have attempted to model a real-world brush and its behavior in the context of such an operation. For example, a two-dimensional (2D) raster image may be created to represent the shape of the brush as it contacts the canvas, and the 2D image may be stamped repeatedly along the input path. In another approach, a vector representation of the brush tip has been used instead of a 2D raster image.

Some existing digital painting applications create strokes by repeatedly applying a stamp at incremental positions along a path. The stamp consists of a 2D array of pixels that represent what the "brush" looks like at an instant in time. By repeatedly applying the stamp at close spacing, the effect of the brush being dragged continuously across the canvas is created, in the form of an elongated stroke. Some existing applications provide multiple settings for users to control the appearance of the stroke, e.g. size, opacity, mark making tool, and brush style. However, such applications led to uniform marks being made by the mark making tool along the stroke as the same process as applied by the software application at each point along the stroke.

However, some areas of a painting involve repetitive strokes, which can take a lot of time for the user. Accordingly, it would be beneficial to provide the user with automated methods and systems that maintain the level of control the user seeks or needs whilst removing the repetitive nature of the area filling thereby saving the user time whilst delivering high quality results.

It would be beneficial for the area to be painted with actual, individual strokes, offering the advantages of overlapping strokes and mixing paint for an increased "natural" media look and feel.

It would be further beneficial for the user to be able to either specify parameters for the process in advance or to sculpt/tune the result as the software application paints.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to digital imagery and more particularly to reducing repetitive strokes for filling an area by providing brush stroke tools, or mark making tools, that automatically fill the area with natural looking brush strokes.

In accordance with an embodiment of the invention there are provided computer executable instructions stored upon a non-volatile, non-transitory storage medium where the executable instructions when executed by one or more processors of a system configure the system to execute a process comprising:

establishing in dependence upon user input a first point within a document opened upon the system;

establishing in dependence upon further user input a second point within the document;

establishing in dependence upon additional user input one or more stroke parameters to apply to rendering content at least one of the first point and the second point; and executing a stroke tapestry engine to generate a stroke tapestry for rendering upon a display associated with the system; wherein the stroke tapestry comprises a plurality of brush strokes automatically generated by the stroke tapestry engine along a path established between the first point and the end point; and the plurality of brush strokes transition from one or more first marks at the first point to one or more second marks at the second point in dependence upon the one or more stroke parameters.

In accordance with an embodiment of the invention there are provided computer executable instructions stored upon a non-volatile, non-transitory storage medium where the executable instructions when executed by one or more processors of a system configure the system to execute a process comprising:

establishing in dependence upon user input a first point within a document opened upon the system and one or more stroke parameters to apply to rendering content at the first point;

assigning the first point and one or more stroke parameters to a first brush engine;

establishing in dependence upon further user input a second point within the document opened upon the system and one or more further stroke parameters to apply to rendering content at the second point;

assigning the second point and one or more further stroke parameters to a second brush engine;

executing a stroke tapestry engine comprising at least the first engine and second engine to generate a stroke tapestry for rendering upon a display associated with the system; wherein the stroke tapestry comprises a plurality of brush strokes automatically generated by the stroke tapestry engine along a path established between the first point and the end point; and the plurality of brush strokes transition from one or more first marks at the first point to one or more second marks at the second point in dependence upon the one or more stroke parameters.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 2 and 3 depict exemplary process flows for user input into a stroke tapestry feature of a software application according to embodiments of the invention;

DETAILED DESCRIPTION

Figure 1A:
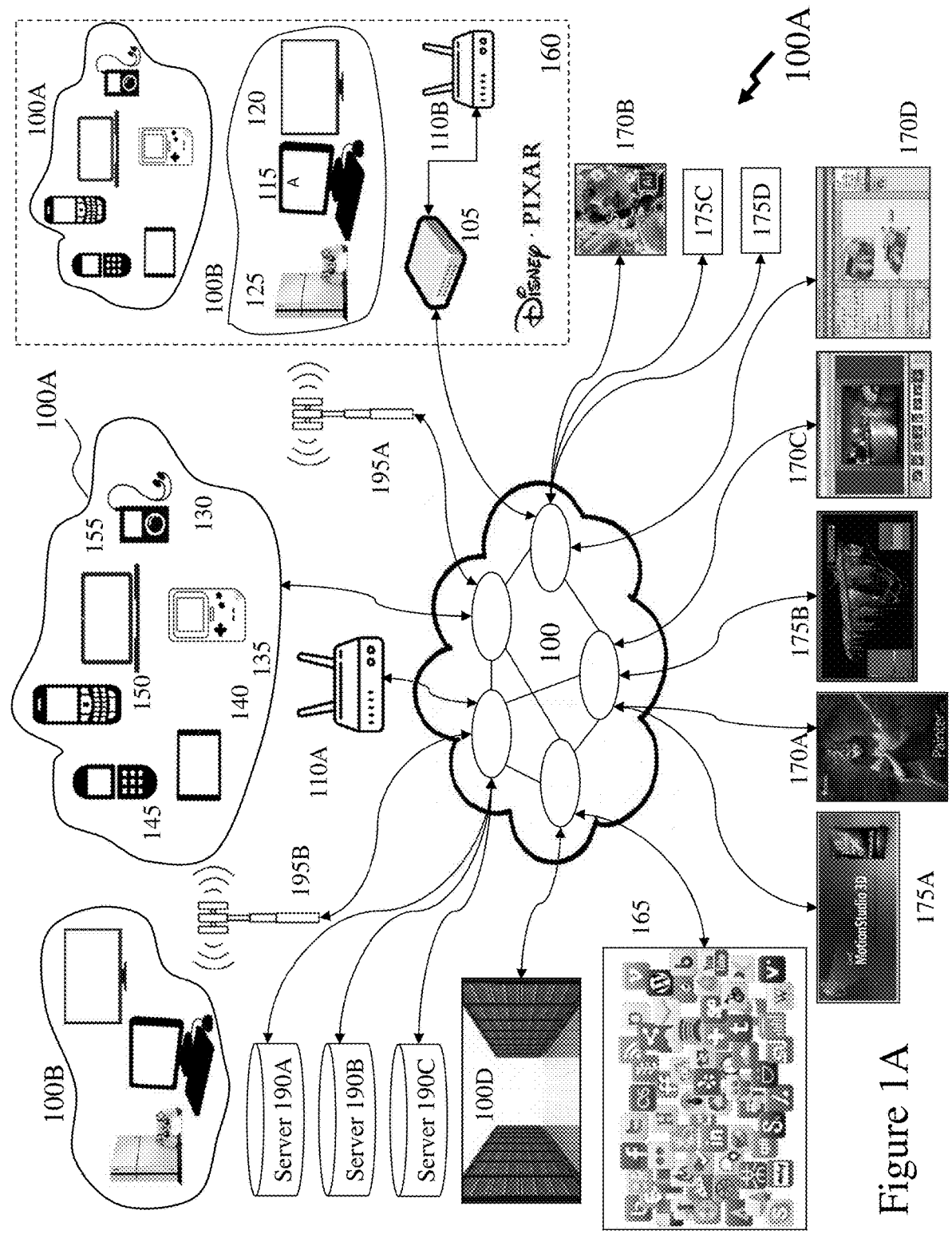
FIG. 1A depicts a network environment within which embodiments of the invention may be employed.

The present invention is directed to digital imagery and more particularly to reducing repetitive strokes for filling an area by providing brush stroke tools, or mark making tools, that automatically fill the area with natural looking brush strokes.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "software application", also referred to as an "application" or "app", as used herein may refer to, but is not limited to, a "standalone software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals exploiting a software application providing a graphics editing system and graphics editing application/platform (GESGEAP) implementing one or more embodiments of the invention. This includes, but is not limited to, private individuals, employees of organizations and/or enterprises, members of community organizations, members of charity organizations, men, women, children, teenagers, and animals. In its broadest sense the user may further include, but not be limited to, software systems, mechanical systems, robotic systems, android systems, etc. that may be characterised by providing a gesture or data relating to a gesture to a software application providing a graphics editing system and graphics editing application/platform (GESGEAP) implementing one or more embodiments of the invention.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is capable of being at least one of generated, selected, created, modified, and transmitted with a software application allowing a user of the software application to generate, select, create, modify, and edit visual and/or audiovisual content within the digital content.

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet. "Document information" as used herein may refer to, but is not limited to, may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

A "mark making tool", also referred to as a "mark tool" or "marking tool", as used herein may refer to, a tool for applying a visual effect to a graphics image within a software application including, for example, a graphics generating tool, a graphics editing tool, and an image processing tool. Accordingly, a mark making tool may simulate real and unreal systems for the application, removal, or modification of information including, but not limited to, colour, texture, and content to a graphics image. As such a mark making tool may include, but is not limited to, a brush, an air brush, a pen, a pencil, a nib, a spray can, a sprayer, a sponge, a knife, a mathematical algorithm, a physical system of elements obeying physical laws, and a physical system obeying non-physical laws.

A "brush stroke" or "stroke", as used herein may refer to, but is not limited to a class of mark making tools that simulate physical brushes for applying a medium, e.g. oil, watercolour, acrylic, onto a canvas, document, or other surface. A stroke may alternatively be simulating other physical medium application techniques including, but not limited, to airbrushes, chalk, markers, palette knives and sponges for example. Accordingly, within this description the term brush is not limited to a physical brush but should be interpreted as meaning a tool to apply a medium to a surface.

A "brush engine", as used herein may refer to, a module or modules forming part of a graphics software application which generates brush strokes within the graphics software application to render the brush strokes upon the virtual canvas or other surface to which the brush stroke(s) are applied.

A "gesture", also referred to as a "motion" or "input", as used herein may refer to, an action by a user resulting in the movement and/or action of a mark making tool relative to a graphics image within a software application including, for example, a graphics generating tool, a graphics editing tool, and an image processing tool. As such a gesture may include, but not be limited to, a swipe, a tap, a motion, a press, and a click captured by the software application through an interface including, but not limited to, image processing, image capture, audio command, a user interface and a haptic interface.

A "gesture characteristic", also referred to as a "gesture expression" or an "expression", as used herein may refer to an aspect of a gesture of a user or setting exploited within a software application to modify a value relating to a mark making tool within the software application. As such as a gesture characteristic or expression may include, but not be limited to, velocity, direction, pressure, wheel, tilt, bearing, rotation, source of the gesture, and random. A source of the gesture may include, but not be limited to, a touchpad, a stylus, a mouse, keypad, keyboard, accelerometer or accelerometer derived data, tracked motion of a user or a predetermined portion of a user, an external image source, an external audiovisual source, an external multimedia source, biometric data of a user, and an item of environmental data. An expression or gesture characteristic may be applied to one or more behaviours/aspects of a mark making tool including, but not limited to, global chaos, local chaos, smoothness, damping, jitter, number, count, weighting, force, direction, mapping, colour, colour variability, resaturation, bleed, feature, grain, concentration, setting rate, viscosity, wetness, opacity and hardness.

A "user interface", also referred to as a "controller" or "haptic interface", as used herein may refer to a device and/or system capturing one or more actions of a user and providing these to a software application. Accordingly, a user interface may include an image capture/processing system, a gesture recognition system, a stylus, a wearable device, a touchscreen, a keypad, a mouse, a touchpad, a tablet, an accelerometer, and a motion recognition system.

"Stroke tapestry" or a "stroke tapestry", as used herein refers to, but is not limited to, a software feature or a result of a software feature within a graphics editing system and graphics editing application/platform (GESGEAP) according to embodiments of the invention which fills an area using a series of strokes generated by the GESGEAP.

A "software engine" (engine) as used herein refers to, but is not limited to, a piece of software providing an encapsulated block of functionality.

A "spooler" as used herein refers to, but is not limited to, a software component of a GESGEAP which processes stroke data, such as physical coordinates, and expression (gesture characteristic) data to generate a stroke.

Referring to FIG. 1A there is depicted a Network Environment 100A within which embodiments of the invention may be employed supporting graphics editing systems and graphics editing applications/platforms (GESGEAPs) according to embodiments of the invention. Such GESGEAPs, for example including digital graphics editor and digital painting applications. As shown first and second user groups 100A and 100B respectively interface to a telecommunications Network 100. Within the representative telecommunication architecture a remote central exchange 180 communicates with the remainder of a telecommunication service providers network via the Network 100 which may include for example long-haul OC-48/OC-192 backbone elements, an OC-48 wide area network (WAN), a Passive Optical Network, and a Wireless Link. The central exchange 180 is connected via the Network 100 to local, regional, and international exchanges (not shown for clarity) and therein through Network 100 to first and second cellular APs 195A and 195B respectively which provide Wi-Fi cells for first and second user groups 100A and 100B respectively. Also connected to the Network 100 are first and second Wi-Fi nodes 110A and 110B, the latter of which being coupled to Network 100 via router 105. Second Wi-Fi node 110B is associated with Enterprise 160, e.g. Disney Pixar™, within which are other first and second user groups 100A and 100B. Second user group 100B may also be connected to the Network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the Network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the Network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly portable electronic devices within first user group 100A may form associations either through standards such as IEEE 802.15 or Bluetooth as well in an ad-hoc manner.

Also connected to the Network 100 are Social Networks (SOCNETS) 165, first and second graphics editors 170A and 170B respectively, e.g. Corel™ Painter™ and Adobe™ Illustrator, first and second web based graphic editors 170C and 170D respectively, e.g. PhotoCommander™ and FatPaint™, and first and second video editing tools 175A and 175B respectively, e.g. Corel™ MobileStudioTMand Cinnerla™, first and second graphics tools 175C and 175D as well as first to third servers 190A to 190C respectively which together with others, not shown for clarity. First to third servers 190A to 190C respectively may host according to embodiments of the inventions multiple services associated with a provider of graphics editing systems and graphics editing applications/platforms (GESGEAPs); a provider of a SOCNET or Social Media (SOME) exploiting GESGEAP features; a provider of a SOCNET and/or SOME not exploiting GESGEAP features; a provider of services to PEDS and/or FEDS; a provider of one or more aspects of wired and/or wireless communications; an Enterprise 160 exploiting GESGEAP features; license databases; content databases; image databases; content libraries; customer databases; websites; and software applications for download to or access by FEDs and/or PEDs exploiting and/or hosting GESGEAP features. First to third servers 190A to 190C respectively may also host for example other Internet services such as a search engine, financial services, third party applications and other Internet based services.

Accordingly, a graphics designer and/or user (GRADUS or user) may exploit a PED and/or FED within an Enterprise 160, for example, and access one of the first or second primary content servers 190A and 190B respectively to perform an operation such as accessing/downloading an application which provides GESGEAP features according to embodiments of the invention; execute an application already installed providing GESGEAP features; execute a web based application providing GESGEAP features; or access content. Similarly, a GRADUS may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 1B:
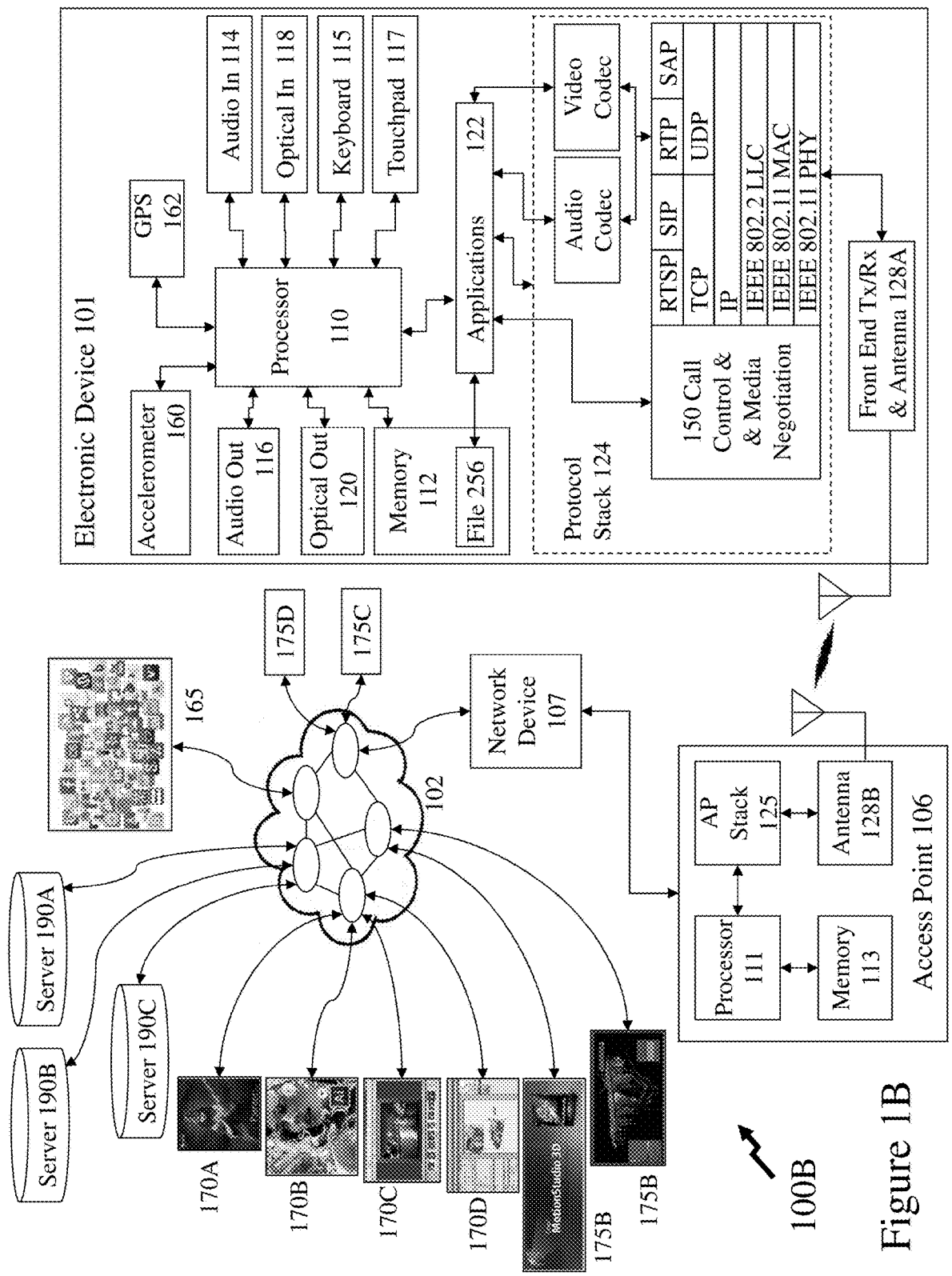
FIG. 1B depicts a wireless portable electronic device supporting communications to a network such as depicted in FIG. 1A and as supporting embodiments of the invention.

Now referring to FIG. 1B there is depicted a Schematic 100B of a network to which an Electronic Device 101 supporting graphics editing systems and graphics editing applications/platforms (GESGEAPs) and GESGEAP features according to embodiments of the invention is connected. Electronic Device 101 may, for example, be a PED, a FED, or a wearable device and may include additional elements above and beyond those described and depicted. Also depicted in conjunction with the Electronic Device 101 are exemplary internal and/or external elements forming part of a simplified functional diagram of an Electronic Device 101 within an overall simplified schematic of a system supporting SAP features according to embodiments of the invention which include includes an Access Point (AP) 106, such as a Wi-Fi AP for example, a Network Device 107, such as a communication server, streaming media server, and a router. The Network Device 107 may be coupled to the AP 106 via any combination of networks, wired, wireless and/or optical communication links. Also connected to the Network 102 are Social Media Networks (SOCNETS) 165; first and second remote systems 170A and 170B respectively; first and second websites 175A and 175B respectively; first and third 3rd party service providers 175C and 175E respectively; and first to third servers 190A to 190C respectively.

The Electronic Device 101 includes one or more Processors 110 and a Memory 112 coupled to Processor(s) 110. AP 106 also includes one or more Processors 111 and a Memory 113 coupled to Processor(s) 210. A non-exhaustive list of examples for any of Processors 110 and 111 includes a central processing unit (CPU), a digital signal processor (DSP), a reduced instruction set computer (RISC), a complex instruction set computer (CISC), a graphics processing unit (GPU) and the like. Furthermore, any of Processors 110 and 111 may be part of application specific integrated circuits (ASICs) or may be a part of application specific standard products (ASSPs). A non-exhaustive list of examples for Memories 112 and 113 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic Device 101 may include an audio input element 214, for example a microphone, and an Audio Output Element 116, for example, a speaker, coupled to any of Processor(s) 110. Electronic Device 101 may include an Optical Input Element 218, for example, a video camera or camera, and an Optical Output Element 220, for example an LCD display, coupled to any of Processor(s) 110. Electronic Device 101 also includes a Keyboard 115 and Touchpad 117 which may for example be a physical keyboard and touchpad allowing the user to enter content or select functions within one of more Applications 122. Alternatively, the Keyboard 115 and Touchpad 117 may be predetermined regions of a touch sensitive element forming part of the display within the Electronic Device 101. The one or more Applications 122 that are typically stored in Memory 112 and are executable by any combination of Processor(s) 110. Electronic Device 101 also includes Accelerometer 160 providing three-dimensional motion input to the Processor(s) 110 and GPS 162 which provides geographical location information to Processor(s) 110.

Electronic Device 101 includes a Protocol Stack 124 and AP 106 includes an AP Stack 125. Within Protocol Stack 124 is shown an IEEE 802.11 protocol stack but alternatively may exploit other protocol stacks such as an Internet Engineering Task Force (IETF) multimedia protocol stack for example or another protocol stack. Likewise, AP Stack 125 exploits a protocol stack but is not expanded for clarity. Elements of Protocol Stack 124 and AP Stack 125 may be implemented in any combination of software, firmware and/or hardware. Protocol Stack 124 includes an IEEE 802.11-compatible PHY module that is coupled to one or more Tx/Rx & Antenna Circuits 128A and an IEEE 802.11-compatible MAC module which is coupled to an IEEE 802.2-compatible LLC module. Protocol Stack 124 also includes modules for Network Layer IP, a transport layer User Datagram Protocol (UDP), a transport layer Transmission Control Protocol (TCP), a session layer Real Time Transport Protocol (RTP), a Session Announcement Protocol (SAP), a Session Initiation Protocol (SIP) and a Real Time Streaming Protocol (RTSP). Protocol Stack 124 includes a presentation layer Call Control and Media Negotiation module 150, one or more audio codecs and one or more video codecs. Applications 122 may be able to create maintain and/or terminate communication sessions with the Network Device 107 by way of AP 106 and therein via the Network 102 to one or more of Social Networks (SOCNETS) 165; first and second graphics editors 170A and 170B respectively, e.g. Corel™ Painter™ and Adobe™ Illustrator, first and second web based graphic editors 170C and 170D respectively, e.g. PhotoCommander™ and FatPaint™, and first and second video editing tools 175A and 175B respectively, e.g. Corel™ MobileStudioTMand Cinnerla™, first and second graphics tools 175C and 175D as well as first to third servers 190A to 190C respectively which together with others, not shown for clarity.

Typically, Applications 122 may activate any of the SAP, SIP, RTSP, and Call Control & Media Negotiation 150 modules for that purpose. Typically, information may propagate from the SAP, SIP, RTSP, Call Control & Media Negotiation 150 to the PHY module via the TCP module, IP module, LLC module and MAC module. It would be apparent to one skilled in the art that elements of the Electronic Device 101 may also be implemented within the AP 106 including but not limited to one or more elements of the Protocol Stack 124, including for example an IEEE 802.11-compatible PHY module, an IEEE 802.11-compatible MAC module, and an IEEE 802.2-compatible LLC module. The AP 106 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, and a call control & media negotiation module. Portable electronic devices (PEDs) and fixed electronic devices (FEDs) represented by Electronic Device 101 may include one or more additional wireless or wired interfaces in addition to or in replacement of the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1010, DSL, Dial-Up, DOCSIS, Ethernet, G.hn, ISDN, MoCA, PON, and Power line communication (PLC).

The Front End Tx/Rx & Antenna 128A wirelessly connects the Electronic Device 101 with the Antenna 128B on Access Point 206, wherein the Electronic Device 101 may support, for example, a national wireless standard such as GSM together with one or more local and/or personal area wireless protocols such as IEEE 802.11 a/b/g Wi-Fi, IEEE 802.16 WiMAX, and IEEE 802.15 Bluetooth for example. Accordingly, it would be evident to one skilled the art that the Electronic Device 101 may accordingly download original software and/or revisions for a variety of functions. In some embodiments of the invention the functions may not be implemented within the original as sold Electronic Device 101 and are only activated through a software/firmware revision and/or upgrade either discretely or in combination with a subscription or subscription upgrade for example. Accordingly, as will become evident in respect of the description below the Electronic Device 101 may provide a user with access to one or more GESGEAP including, but not limited to, software installed upon the Electronic Device 101 or software installed upon one or more remote systems such as those associated with Social Networks (SOCNETS) 165; first and second graphics editors 170A and 170B respectively, e.g. Corel™ Painter™ and Adobe™ Illustrator, first and second web based graphic editors 170C and 170D respectively, e.g. PhotoCommander™ and FatPaint™, and first and second video editing tools 175A and 175B respectively, e.g. Corel™ MobileStudioTMand Cinnerla™, first and second graphics tools 175C and 175D as well as first to third servers 190A to 190C respectively.

Figure 1C:
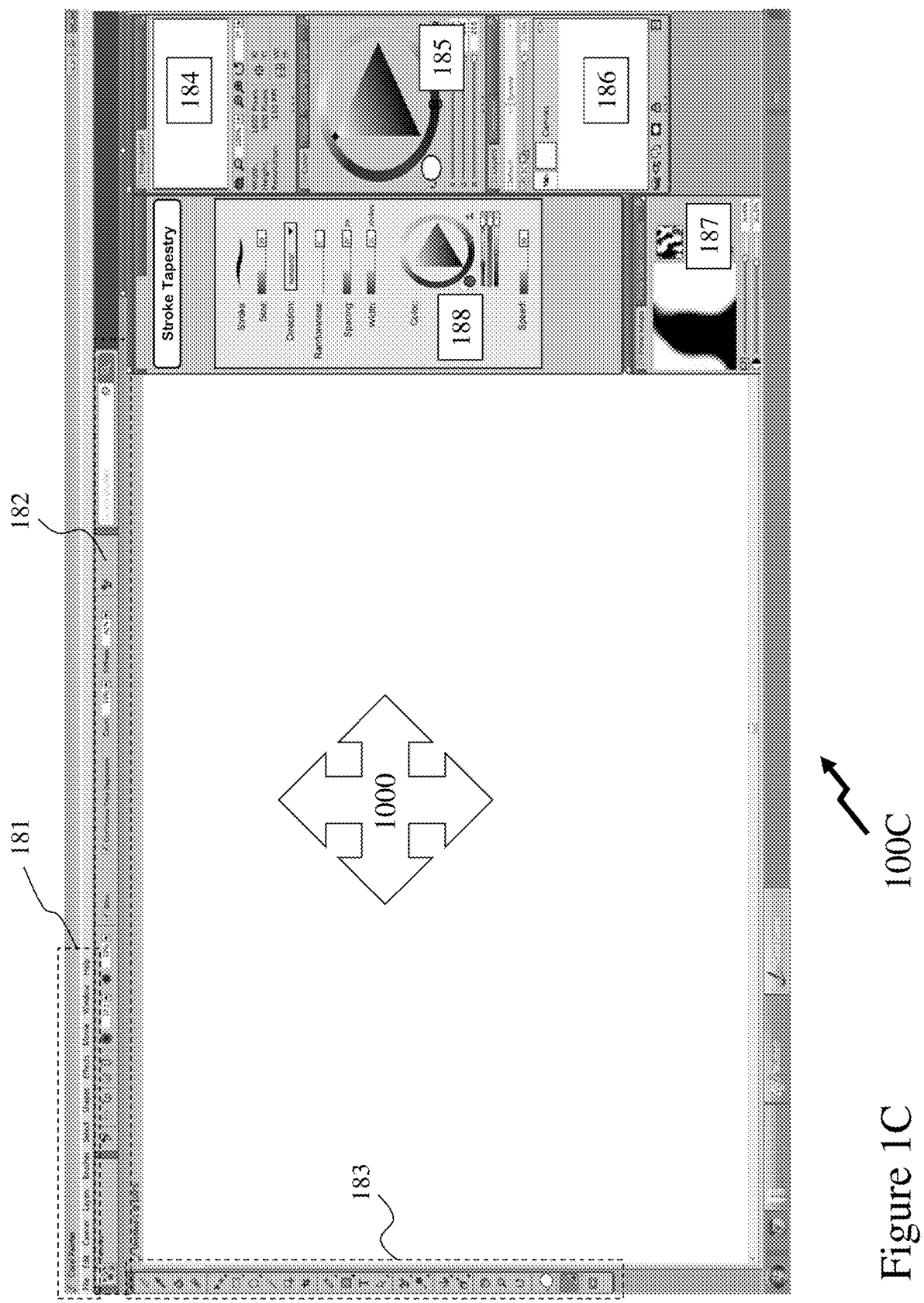
FIG. 1C depicts home screen of a graphics editing system and graphics editing application/platform (GESGEAP) implementing one or more embodiments of the invention.

Now referring to FIG. 1C there is depicted a Home Screen 100C of a digital graphics editor, digital painting, application, the GESGEAP, according to an embodiment of the invention, e.g. Corel™ Painter™. Accordingly, within the Home Screen 100C a user has opened a Window 1000, which may for example be untextured, textured to mimic a paper, canvas, or other surface for "painting." Optionally, a texture may be applied prior to the user beginning work, during their work, or upon its completion. Similarly, other effects may be added by the user through the Menu Bar 181 including employing multiple layers with different effects and/or properties, different illuminations, etc. as known within the art. The user may also be resented with a series of menus that can be manipulated, docked, undocked and moved with respect to the Home Screen 100C and allowing the user to select, adjust, modify, add, delete, and control various aspects of their interaction with the GESGEAP. These include, but are not limited to:

Mark Making Tool Selector and Settings 182;
Main Feature Menu 183;
Canvas Navigator Menu 184;
Colour Menu 185, for the overall application;
Layer/Channel Management Menu 186
Flow Mapping Menu 187, which allows an underlying mapping to be applied to effects although actual flow map employed is itself not rendered; and
Stroke Tapestry Menu 188.

Accordingly, within the embodiments of the invention described below and in respect of FIGS. 2 to 21 a user may select features and functionalities according to embodiments of the invention and establish aspects of these at different settings through such menus and others as would be evident to one of skill in the art.

As noted supra prior art GESGEAPs in order to improve realism within graphical images generated and/or modified by users with the GESGEAPs provide mark making tools with automatic generation options in response to the user's stroke with the mark making tool. Whilst many, of these automatically generated aspects of the user's stroke do indeed add perceived realisms such as varying brush pressure on application/removal from a canvas and/or paper or the abrupt application from activation of a spray can nozzle for example. However, in many instances these automatically generated effects within the stroke are implemented through the application of random behaviours to the strokes which actually appear less realistic as they reflect instances that a user, for example, painting with watercolours or oils, could not achieve. Accordingly, the inventors have established a methodology of automatically adding noise to the computer generated mark making tool strokes allowing aspects of the mark making tool generated to be varied automatically. The inventors have associated the terms "randomness" within the context of this application to this setting which can be set by the user through the Stroke Tapestry Menu 188.

Whilst, within the ensuing embodiments of the invention as described and depicted with respect to FIGS. 2 to 21 respectively the concepts are presented with respect to brush strokes and brush mark making tools it would be evident to one of skill in the art that the methods and systems described may be applied to other mark making tools for filling areas of the canvas. For example, within Corel™ Painter™, a series of mark making tools which may exploit embodiments of the invention are provided within different categories of mark making tools including:
- Airbrushes
- Artists
- Chalks
- Gel
- Gouache;
- Impasto;
- Markers;
- Palette Knives;
- Real Watercolour; and
- Sponges.

However, some areas of a painting involve repetitive strokes, which can take a lot of time for the user. Accordingly, the inventor has established graphics editing systems and graphics editing applications/platforms (GESGEAPs) which, beneficially, provide a user with automated methods and systems that maintain the level of control the user seeks or needs whilst removing the repetitive nature of the area filling thereby saving the user time whilst delivering high quality results.

These GESGEAPs, beneficially, filling the area to be painted with actual, individual strokes, offering the advantages of overlapping strokes and mixing paint for an increased "natural" media look and feel. Further, these GESGEAPS beneficially allow the user to either specify parameters for the process in advance or to sculpt/tune the result as the software application paints.

Accordingly, by employing what the inventor refers to as a "stroke tapestry" or "stroke tapestry effect a user can move beyond the current paradigm of random/pattern-based fills. In its most simple form, a user can specify an initial stroke at one point within a document, e.g. canvas, specify a different stroke at another point in the document and the stroke tapestry feature within the GESGEAP automatically interpolates a series of new strokes between these two ends in a visually appealing manner.

For example, some existing, traditional artistic methods tend to involve a significant number of manually applied strokes, which take a lot of time. Some examples of these employed when creating art in a specific style include, but are not limited to, pointillism (stippling), impressionism, and abstract expressionism. Further, multiple repeating strokes or patterns are frequently needed to mimic real-world, conceptual or abstract imagery. Examples of such naturally occurring elements include, but are not limited to, waves, leaves on trees, grass, clouds, and precipitation. Lastly, brush strokes may simply be needed over areas to create depth, texture or an area of interest. Examples in this instance including, but not being limited to, creating texture or patterns, splattering, a gradient of strokes from a heavy texture to light texture or vice-versa, a gradient of strokes with rich, saturated color to areas of low saturation or vice-versa.

Within prior art GEGEAPs techniques exist for so-called "auto-painting" where in this process, the user has options as to which strokes are applied and how many layers of strokes are applied, but they are not able to specify a stroke pattern, or able to control the transition between two or more stroke patters, so the strokes appear to be very computer generated.

Within some prior art GESGEAPs there are functions available to find edges or objects within the content already applied to the canvas or document being worked upon. Examples of this include so-called "Smart Strokes" or "saliency" in Corel™ Painter™. Whilst the underlying technology of these features can aid the user to help ensure strokes end up on relevant features of the image such as objects, the strokes do not always go in an orientation that is expected. For example, adding strokes to look like waves on a lake with such features can cause issues as the applied strokes are simply following the shape of the shoreline rather than reflecting the real world nature of waves approaching a varied geometry.

Further, within some prior art GEGEAPs, such as Corel™ Painter™ for example, a technology feature accessible to users is what is referred to as "cloning." This technology samples one or more pixels of a source image and automatically alters the color of a new brush stroke to match or closely match the colour of these one or more pixels in an underlying "source image". This technology can be exploited for discrete user driven brush strokes, in auto-painting, or a combination of the two.

As will become evident through the following description embodiments of the invention relating to a "stroke tapestry" or "stroke tapestries" enable users to control an area being auto-filled with a range of brush technologies, brush strokes, and/or paint types in order to obtain more interesting results or results that mimic the reality they seek to include. Embodiments of the invention therefore may combine the underlying technology of a stroke tapestry with technology such as "Smart Strokes", saliency and cloning discretely or in combinations thereof. These combinations therefore allowing the user to combine stroke tapestries with their intelligent strokes and/or intelligent paths to direct these underlying technologies.

Within embodiments of the invention described and depicted below, particularly with respect to FIGS. 11 to 20, the underlying technology is presented with respect to simple paths with two or more points. However, it would be evident that in the definition of these points, either individually or as a path via a stroke that each gesture thereby has associated with it one or more gesture characteristics or expressions which may be employed within the stroke tapestry generation according to embodiments of the invention.

Such gesture characteristics or expressions may include, but not be limited to, velocity, direction, pressure, wheel, tilt, bearing, rotation, and a source of the gesture for example where the source of the gesture to which the gesture characteristics relate may include, but not be limited to, a touchpad, a stylus, a mouse, keypad, keyboard, accelerometer or accelerometer derived data, tracked motion of a user or a predetermined portion of a user, an external image source, an external audiovisual source, an external multimedia source, biometric data of a user, and an item of environmental data. An expression or gesture characteristic may be applied to one or more behaviours/aspects of the stroke tapestry generation including, but not limited to, applying global chaos, applying local chaos, applying smoothness, damping, applying jitter, defining a number or count of brush strokes, a weighting, simulated force applied to brush, direction, mapping, colour, colour variability, saturation, bleed, feature, grain, concentration, setting rate, viscosity, wetness, opacity and hardness, for example.

These gesture characteristics or expressions may be automatically determined by the GESGEAP from one or more user interfaces to the GESGEAP which may include, but not be limited to, an image capture/processing system, a gesture recognition system, a stylus, a wearable device, a touch-screen, a keypad, a mouse, a touchpad, a tablet, an accelerometer, and a motion recognition system.

As described below with respect to FIG. 1D a setting for the stroke tapestry feature discretely identified in the Control Graphical User Interface (GUI) 100D is "Speed." This sets the speed at which strokes within the stroke tapestry are generated allowing the user to guide their generation, such as allowing them to choose areas of interest that receive more strokes for example or optionally the stroke size, opacity, bearing, etc. through modifications made to the gesture characteristics established when the user initially established the stroke tapestry being applied.

Accordingly, a typical process flow for a stroke tapestry according to an embodiment of the invention may execute as follows through first to

- First step, where a document, i.e. a rendered representation of a portion of an item of content, is selected.
- Second step, where the user operates a graphical control to define a starting point for the stroke tapestry and specifies parameters for the one or more brush engines generating the stroke tapestry such as size, opacity, stroke shape, etc. These may be defined specifically by the user through one or more graphical user interfaces (GUIs) or automatically derived as one or more gesture characteristics.
- Third step, where the user specifies the end point and specifies the same or different parameters for the one or more brush engines generating the stroke tapestry These may be similarly defined specifically by the user through one or more GUIs or automatically derived as one or more gesture characteristics.
- Fourth step, where the user specifies how the one or more brush engines interpolate between the two points, such as how many strokes, how wide the area of coverage will be, what type of path/shape/randomness (simply referred to as a path throughout this disclosure) for the coverage, and if any other aspects will be allowed to influence the strokes such as "smart strokes", saliency, image processing for edge detection and/or object detection, etc.
- Fifth step, where the user specifies how fast the strokes will be added (speed), and whether they will be able interact with the strokes being generated in real-time in order to influence the stroke tapestry;
- Sixth step, where based upon the defined parameters, in its most basic implementation, the stroke tapestry engine comprising one or more burst engines calculates the required number of steps required to complete the request as well as mapping out the parameters needed for each individual step; and
- Seventh step, where the stroke tapestry engine generates and renders the stroke tapestry to the user adjusted according to the speed set by the user if they wish to dynamically interact with and/or influence the stroke tapestry generated.

Within other embodiments of the invention the user may choose from a selection of pre-determined parameters through one or more GUIs within the GESGEAP, such that there are fewer choices for them to make, and the stroke tapestry generation experience is streamlined. For example, the user may be able to select a stroke tapestry which mimics an existing, artistic convention, such as, for example, a "light stippling" preset or "heavy stippling" preset for one node of the path and the other of "light stippling" and "heavy stippling" for another node or define the same for each node. Such presets may be for standard painting techniques, such as pointillism, for example or they may be specific to a particular painters exploitation of such a technique or group of painters. For example, a user may be able to select "Neo-Impressionism pointillism" or "Divisionist pointillism", the latter using a similar technique of patterns to form images though with larger cube-like brushstrokes.

It would be evident that the stroke tapestry engine may have to "interpolate" between the parameters, either user specified or automatically specified, to fill the area as requested. For example, a brush may start with a small size, e.g. 10 pixels in diameter, but may end with a larger size, e.g. 100 pixels in diameter. Accordingly, if the user requests to fill a path 200 pixels wide by 200 pixels tall, then the initial stroke "row" will need 10 brush strokes but the final stroke "row" will need only 2 brush strokes. Accordingly, the stroke tapestry engine will interpolate for each subsequent "row" of strokes going from small (10 px) slowly up to large (100 px). In other cases, space between each stroke may be desirable, and can be specified by the user or preset. Optionally, the gradation may be non-linear rather than linear or it may be defined by on or more aspects of the setting up of the stroke tapestry such as from the gesture characteristics, analysis of an underlying image or content where the stroke tapestry is being applied (where this underlying image or content is part of the document or simply used to define aspects of the document but does not form part of the document when finally rendered.

It would be evident that varying degrees of randomness, non-linearity, noise, or jitter may also be introduced, either as a user parameter or as a fixed part of the calculation, to influence the results.

In addition, the user may specify different strokes that the stroke tapestry follows. The stroke may be a simple s-curve, a swirl, a diagonal stroke, or even some stroke they record and save in the GESGEAP and retrieve/apply. In these instances, the recorded stroke path may be fitted to start exactly at the start/end points defined by the user or the stroke tapestry engine may calculate an interpolated path to which the strokes are applied.

Figure 1D:
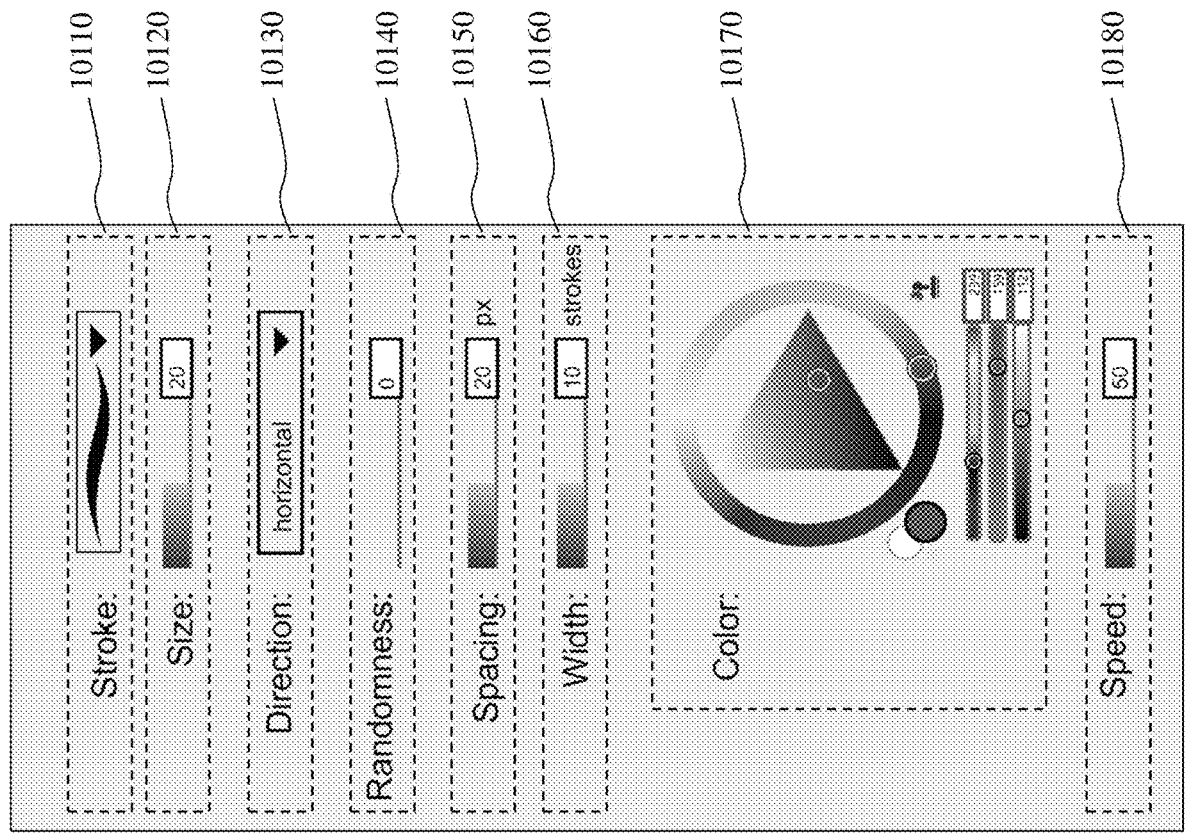
FIG. 1D depicts an exemplary Control Graphical User Interface (GUI) within a graphics editing system and graphics editing application/platform (GESGEAP) implementing one or more embodiments of the invention to provide what the inventors refer to as a "Stroke Tapestry"

Now referring to FIG. 1D there is depicted an exemplary Control Graphical User Interface (GUI) 100D within a graphics editing system and graphics editing application/platform (GESGEAP) implementing one or more embodiments of the invention to provide a stroke tapestry. Accordingly, as depicted there are first to eighth GUI elements 10110 to 10180 comprising:

- First GUI element 10110 where the user can select a preset stroke type from a drop menu or menus of stroke options. Optionally, the user may select the "brush" (e.g. airbrush, chalk, brush, sponge etc.) and then the stroke type. Optionally, through these menu(s) the user may alternatively select "user input" so that they generate the brush stroke to be employed or may select a painter, painting style etc. as described above.
- Second GUI element 10120 wherein the size of the strokes at that point about to selected or just established is set;
- Third GUI element 10130 wherein the direction of the strokes at that point about to selected or just established is set;
- Fourth GUI element 10140 wherein a degree of randomness of the strokes at that point about to selected or just established is set;
- Fifth GUI element 10150 wherein a spacing between the strokes established by the stroke tapestry engine at that point about to selected or just established is set;
- Sixth GUI element 10160 wherein a width of strokes established by the stroke tapestry engine at that point about to selected or just established is set;
- Seventh GUI element 10170 wherein a colour of the strokes established by the stroke tapestry engine at that point about to selected or just established is set;

Eighth GUI element 10180 wherein the speed at which the stroke tapestry engine generates the stroke tapestry which is being rendered to the user is defined. This may be, for example, a percentage setting, a time between strokes (e.g. equivalent to a pause between rendering a row, column or otherwise defined subset of the strokes of the stroke tapestry.

It would be evident that optionally, the user may establish through the Control GUI 100D that one or more aspects of the path defined by the user may be defined by one or more gesture characteristics of the user's interaction with the document rather than through the drop-down menu. Such features being either through the Control GUI 100D directly or through other GUIs or other means of setting control settings of the stroke tapestry.

Referring to FIGS. 2 and 3 there are depicted exemplary Process Flows 200 and 300 for user input into a stroke tapestry feature of a software application according to embodiments of the invention. Referring initially to Process Flow 200 this is depicted as comprising first to fourth steps 210 to 240; these being:

First step 210 wherein the user specifies the start point with parameters made available to the user;
Second step 220 wherein the start point parameters, e.g. as defined through the Control GUI 100D, gesture characteristics, etc.;
Third step 230 wherein the user defines the end point and its associated parameters; and
Fourth step 240 wherein the user defines additional intermediate points between the start and end points.

Alternatively, the points may be sequentially defined discretely or through a path defined by a stroke where the end point is defined last rather than before intermediate points.

Now referring to Process Flow 300 this is depicted as comprising first to fourth steps 310 to 340; these being:

First step 310 wherein the user specifies a predetermined parameter set, e.g. particular artist, artistic style, presets, defaults, or simply because they wish them applied to all points;
Second step 320 wherein the user defines the start point;
Third step 330 wherein the user defines the end point; and
Fourth step 340 wherein the user defines additional intermediate points between the start and endpoints.

Figure 4:
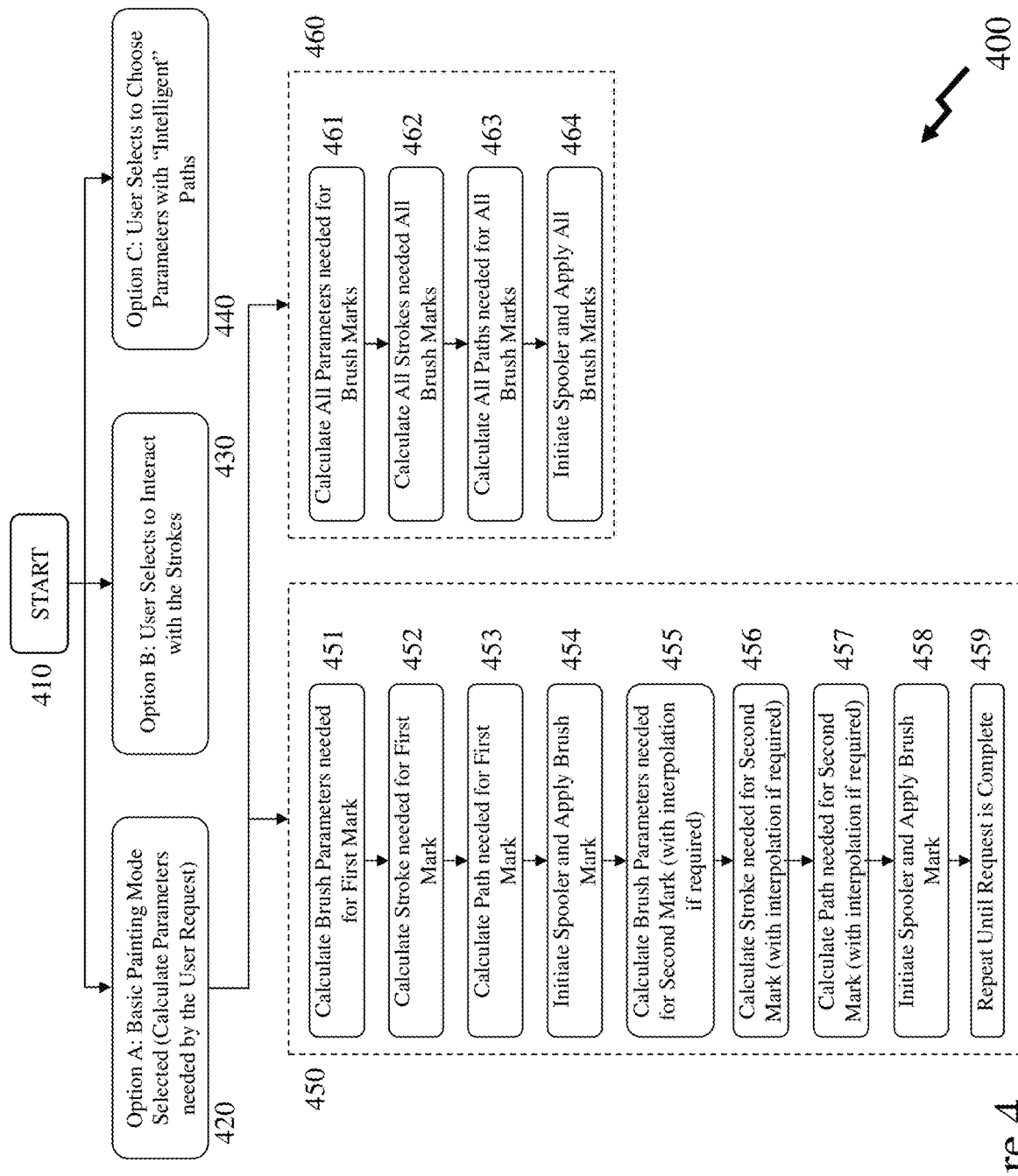
FIGS. 4 to 6 depict exemplary process flows for a software application providing a stroke tapestry feature according to embodiments of the invention.
Figure 5:
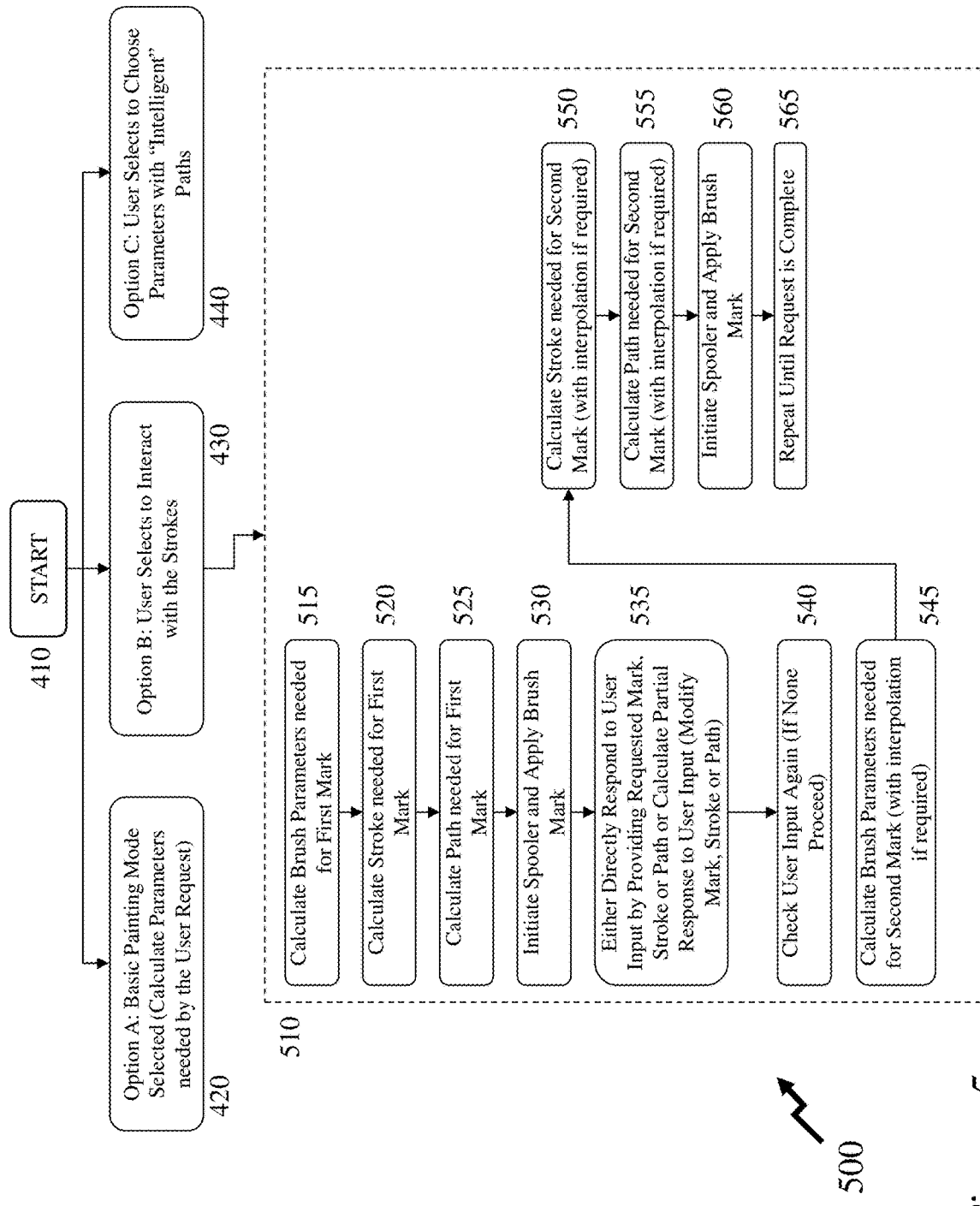
Figure 6:
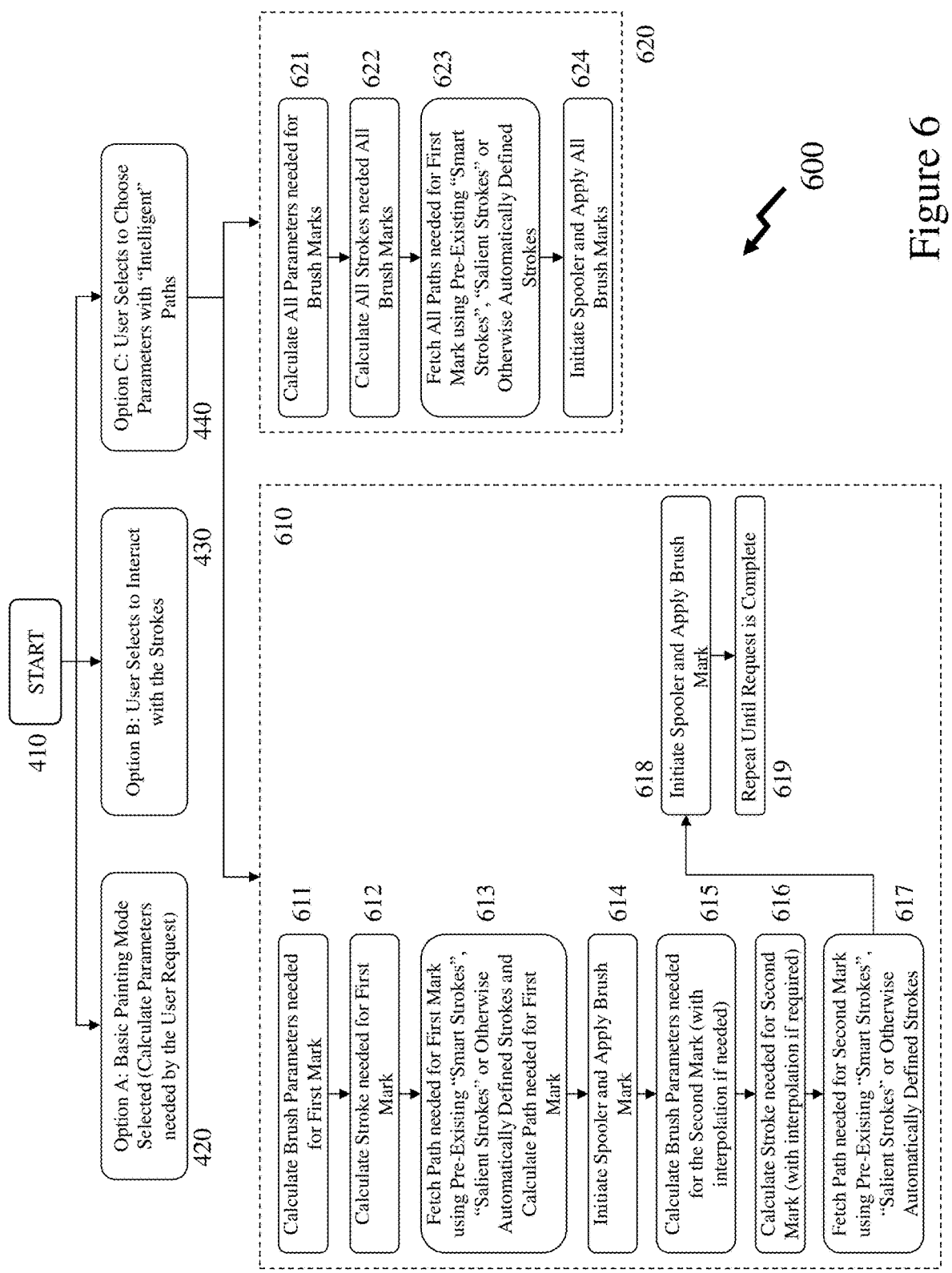

Now referring to FIGS. 4 to 6 there are depicted exemplary Process Flows 400 to 600 for a software application providing a stroke tapestry feature according to embodiments of the invention. Within each of Process Flows 400 to 600 a common set of options are displayed wherein the remainder of each of Process Flows 400 to 600 depicts exemplary process flows triggered from the different options within the set of options. These common steps being first to fourth steps 410 to 440 which comprise:

First step 410 wherein each process starts;
Second step 420 wherein the user may select "Option A" for a basic painting mode;
Third step 430 wherein the user selects "Option B" to interact with the strokes; and
Fourth step 440 wherein the user selects "Option C" to choose parameters in combination with what the inventor refers to as "Intelligent Paths."

Accordingly, referring to FIG. 4 the user upon selecting "Option A" may be presented with an intermediate menu/GUI to establish first Sub-Flow 450 or second Sub-Flow 460 as the process executed by the stroke tapestry engine. Accordingly, as depicted first Sub-Flow 450 comprises first to ninth Sub-Flow Elements 451 to 459, these comprising:

First Sub-Flow Element 451: Calculate Brush Parameters needed for First Mark;
Second Sub-Flow Element 452: Calculate Stroke needed for First Mark;
Third Sub-Flow Element 453: Calculate Path needed for First Mark
Fourth Sub-Flow Element 454: Initiate Spooler and Apply Brush Mark;
Fifth Sub-Flow Element 455: Calculate Brush Parameters needed for Second Mark (with interpolation if required);
Sixth Sub-Flow Element 456: Calculate Stroke needed for Second Mark (with interpolation if required);
Seventh Sub-Flow Element 457: Calculate Path needed for Second Mark (with interpolation if required);
Eighth Sub-Flow Element 458: Initiate Spooler and Apply Brush Mark and
Ninth Sub-Flow Element 459 wherein the process loops and repeats until the request for the stroke tapestry is completed.

Second Sub-Flow 460 comprises tenth to thirteen Sub-Flow Elements 461 to 464, these comprising:

Tenth Sub-Flow Element 461: Calculate All Parameters needed for Brush Marks
Eleventh Sub-Flow Element 462: Calculate All Strokes needed All Brush Marks
Twelfth Sub-Flow Element 463: Calculate All Paths needed for All Brush Marks; and
Thirteenth Sub-Flow Element 464: Initiate Spooler and Apply All Brush Marks.

Accordingly, considering first Sub-Flow 450 and second Sub-Flow 460 for a simple 2-point stroke fill then this may operate in either manner, or one may be defined automatically according to aspects such as available computing power of a local device the user is working upon or whether the GESGEAP is in execution within a virtual machine upon a remote server.

First Sub-Flow 450 represents the scenario where the brush engine calculates the initial brush parameters needed for each brush mark (i.e. size, shape, etc.) and then calculates the strokes and path(s) needed to achieve the first step of the user request. Once these calculations are complete, the program initiates the spooler to execute the application of brush strokes to the document. This is repeated by the brush engine to calculate the next set of parameters required for the second brush mark, run the spooler, etc. until the user-request is complete.

Second Sub-Flow 460 represents the scenario where the brush engine performs the calculations necessary to achieve all specified brush marks, strokes, and paths first. This process is identical to calculating the parameters for a single brush, however it will be applied to every single mark that would be needed based upon the user's parameters, such that the performance of applying the brush strokes is very fast (i.e. real-time or near to real-time). This may have high memory and processing requirements such that it may be enabled under certain hardware/firmware environments rather than all processing environments. Once all possible brush shapes and sizes are calculated, a second round of processing is performed to determine all strokes and paths needed to fulfill the user request. Finally, after these two calculation sets are complete, the program initiates the spooler to execute the application of brush strokes to the document. In this design, the spooler fetches the different brush sizes and shapes from memory. The brush engine will continue this process until the user request is complete.

Now referring to FIG. 5 in Process Flow 500 the user has selected "Option B" and is presented with Sub-Flow 510. As depicted Sub-Flow 510 comprising first to eleventh Sub-Flow Elements 515 to 565 respectively, these comprising:

- First Sub-Flow Element 515: Calculate Brush Parameters needed for First Mark;
- Second Sub-Flow Element 520: Calculate Stroke needed for First Mark;
- Third Sub-Flow Element 525: Calculate Path needed for First Mark;
- Fourth Sub-Flow Element 530: Initiate Spooler and Apply Brush Mark;
- Fifth Sub-Flow Element 535: Either Directly Respond to User Input by Providing Requested Mark, Stroke or Path or Calculate Partial Response to User Input (Modify Mark, Stroke or Path);
- Sixth Sub-Flow Element 540: Check User Input Again (If None Proceed)
- Seventh Sub-Flow Element 545: Calculate Brush Parameters needed for Second Mark (with interpolation if required);
- Eighth Sub-Flow Element 550: Calculate Stroke needed for Second Mark (with interpolation if required);
- Ninth Sub-Flow Element 555: Calculate Path needed for Second Mark (with interpolation if required);
- Tenth Sub-Flow Element 560: Initiate Spooler and Apply Brush Mark; and
- Eleventh Sub-Flow Element 565: Repeat Until Request is Complete.

Now referring to FIG. 6 in Process Flow 500 the user has selected "Option C" may be presented with an intermediate menu/GUI to establish first Sub-Flow 610 or second Sub-Flow 620 as the process executed by the stroke tapestry engine. As depicted first Sub-Flow 610 comprising first to ninth Sub-Flow Elements 611 to 619 respectively, these comprising:

- First Sub-Flow Element 611: Calculate Brush Parameters needed for First Mark
- Second Sub-Flow Element 612: Calculate Stroke needed for First Mark
- Third Sub-Flow Element 613: Fetch Path needed for First Mark using Pre-Existing "Smart Strokes", "Salient Strokes" or Otherwise Automatically Defined Strokes and Calculate Path needed for First Mark;
- Fourth Sub-Flow Element 614: Initiate Spooler and Apply Brush Mark;
- Fifth Sub-Flow Element 615: Calculate Brush Parameters needed for the Second Mark (with interpolation if needed);
- Sixth Sub-Flow Element 616: Calculate Stroke needed for Second Mark (with interpolation if required);
- Seventh Sub-Flow Element 617: Fetch Path needed for Second Mark using Pre-Existing "Smart Strokes", "Salient Strokes" or Otherwise Automatically Defined Strokes;
- Eighth Sub-Flow Element 618: Initiate Spooler and Apply Brush Mark; and
- Ninth Sub-Flow Element 619: Repeat until Request is Complete.

Second Sub-Flow 620 comprises tenth to thirteen Sub-Flow Elements 621 to 624 respectively, these comprising:

- Tenth Sub-Flow Element 621: Calculate All Parameters needed for Brush Marks
- Eleventh Sub-Flow Element 622: Calculate All Strokes needed All Brush Marks
- Twelfth Sub-Flow Element 623: Fetch All Paths needed for First Mark using Pre-Existing "Smart Strokes", "Salient Strokes" or Otherwise Automatically Defined Strokes; and
- Thirteenth Sub-Flow Element 624: Initiate Spooler and Apply All Brush Marks.

Alternatively, the stroke tapestry engine may employ two or more brush engines or the parameters specified fall within the parameters of two or more brush engines. Accordingly, referring to FIGS. 7 and 8A there are depicted exemplary Process Flows 700 and 800A for user input into a stroke tapestry feature of a software application employing multiple brush engines according to embodiments of the invention. Considering initially Process Flow 700 then this, as depicted, may comprise first to fourth Flow Elements 710 to 740 respectively, these comprising:

- First Flow Element 710: User Specifies Start Point with Parameters Made Available to User
- Second Flow Element 720: User Specifies Start Point and Parameters wherein Brush Engine 1 is selected (either by the user or automatically by the stroke tapestry engine or another aspect of the GESGEAP);
- Third Flow Element 730: User Specifies End Point Control with Same Parameters at Start Point or Different Parameters wherein Brush Engine 2 is selected (either by the user or automatically by the stroke tapestry engine or another aspect of the GESGEAP); and
- Fourth Flow Element 740: User Specifies Additional Points between the First Two Points wherein Brush Engine N is selected (either by the user or automatically by the stroke tapestry engine or another aspect of the GESGEAP).

Figures 7, 8A:
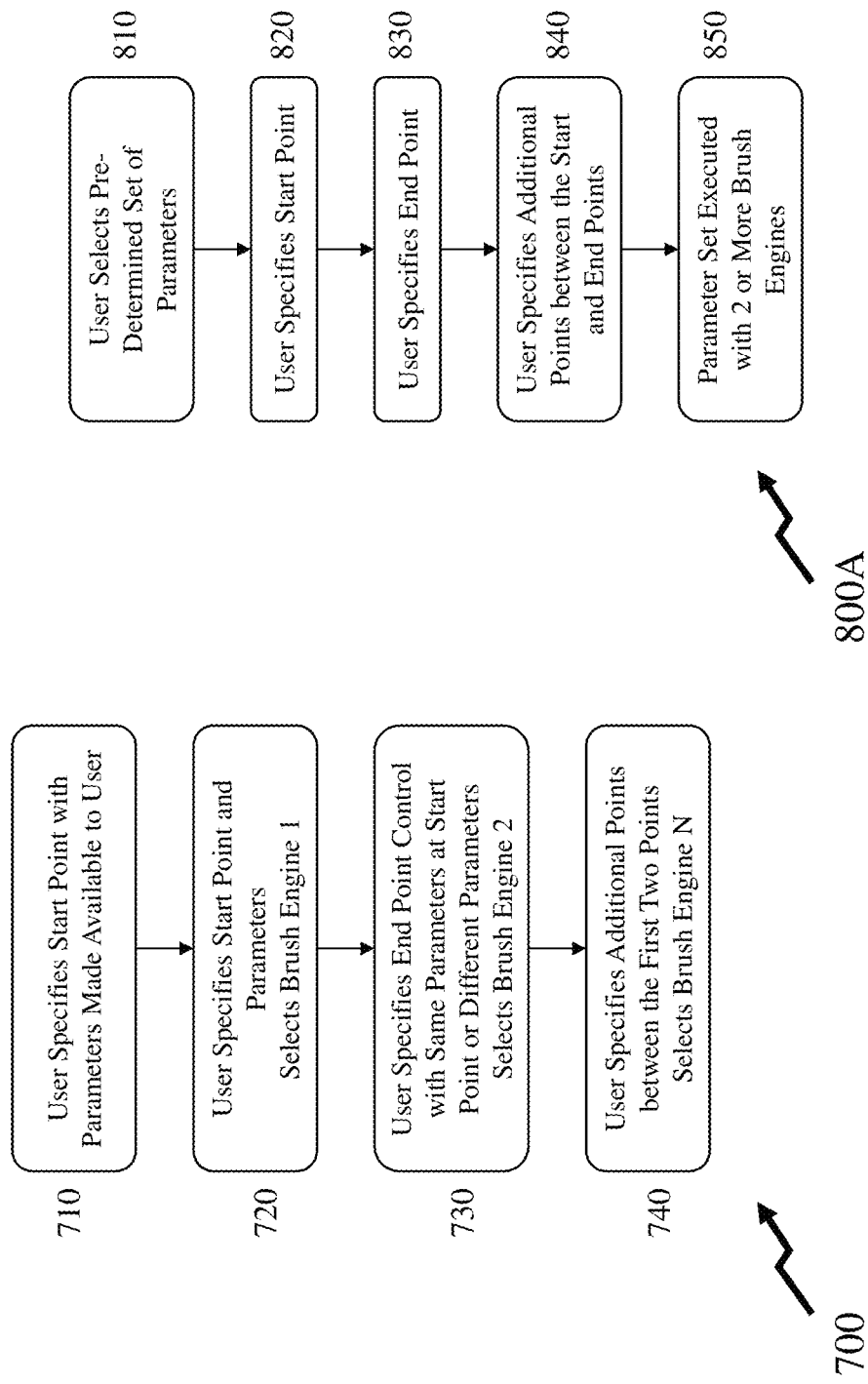
FIGS. 7, 8A and 8B depict exemplary process flows for user input into a stroke tapestry feature of a software application employing multiple brush engines according to embodiments of the invention.

Alternatively, the user may select a predetermined set of parameters thereby triggering Process Flow 800A, as depicted in FIG. 8A, which comprises fifth to ninth Sub-Flow Elements 810 to 850 respectively, these comprising:

- Fifth Sub-Flow Element 810: User Selects Pre-Determined Set of Parameters, this pre-determined set of parameters may include, but not be limited to, values for the brush engine(s), stroke type, media, size, direction, pressure, opacity, and overlap;
- Sixth Sub-Flow Element 820: User Specifies Start Point;
- Seventh Sub-Flow Element 830: User Specifies End Point;
- Eighth Sub-Flow Element 840 User Specifies Additional Points between the Start and End Points; and
- Ninth Sub-Flow Element 850: Parameter Set Executed with 2 or More Brush Engines Alternatively, the points may be sequentially defined discretely or through a path defined by a stroke where the end point is defined last rather than before intermediate points.

Figure 8B:
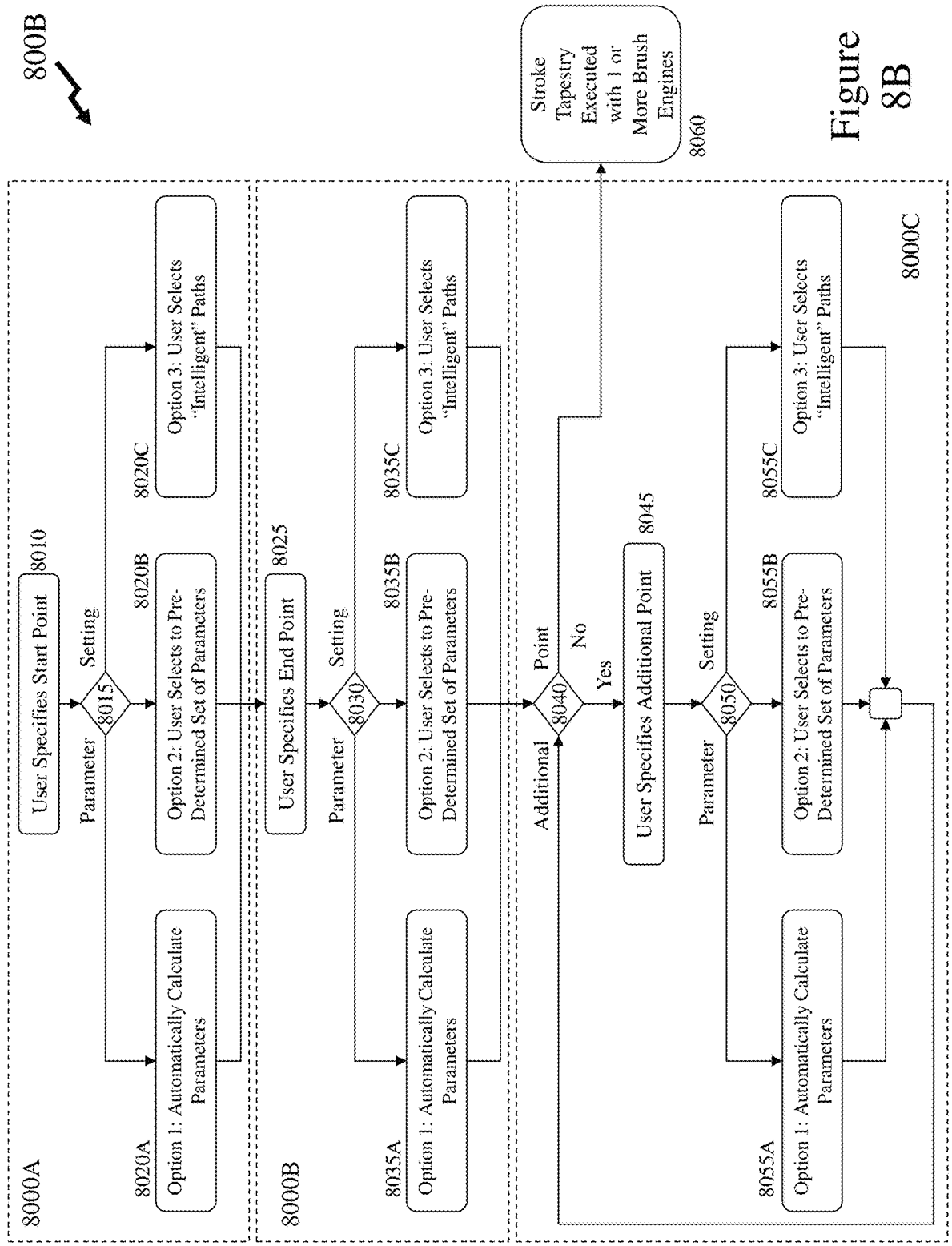

Now referring to FIG. 8B there is depicted an exemplary Process Flow 800B for user input into a stroke tapestry feature of a software application employing one or more brush engines according to embodiments of the invention. Considering Process Flow 800B then this, as depicted, may comprise first to third Sub-Flows 8000A to 800C respectively with final step 8065. First Sub-Flow 8000A comprising first to fifth steps 8010 to 8020C, these comprising:

- First step 8010 wherein the user specifies a start point for the stroke tapestry to be generated;
- Second step 8105 wherein the user is prompted to select a sub-process for establishing the parameters of the start point, which are depicted in this exemplary process flow as being 3 options, being:

"Option 1": Allow the software application and/or one or more brush engines to automatically calculate the parameters;

"Option 2": User selection of a pre-determined set of parameters; and

"Option 3": User selects to employ "intelligent paths";

Third step 8020A wherein the user has selected "Option 1" wherein the software application and/or one or more brush engines automatically calculate the parameters and proceeds to second Sub-Flow 8000B;

Fourth step 8020B wherein the user has selected "Option 2" electing to select a pre-determined set of parameters wherein these are selected by the user, for example, from a drop-down menu or other menu method known the art allowing them to select the pre-determined set of parameters which may be a set defined by the software application, a set previously defined by the user, or a set purchased from a third party where these may be listed using mnemonic, nicknames, etc. such as "leaves", "waves", "warping", "grass", etc. Once selected the process proceeds to second Sub-Flow 8000B; and Fifth step 8020C wherein the user elects to employ "intelligent paths" which are described elsewhere and not repeated here for brevity after which the process proceeds to second Sub-Flow 8000B.

Second Sub-Flow 8000B comprises sixth to tenth steps 80025 to 8035C respectively, these comprising:

Sixth step 8025 wherein the user specifies an end point or end points for the stroke tapestry to be generated;

Seventh step 8030 wherein the user is prompted to select a sub-process for establishing the parameters of the start point, which are depicted in this exemplary process flow as being 3 options, which similarly:

"Option 1": Allow the software application and/or one or more brush engines to automatically calculate the parameters;

"Option 2": User selection of a pre-determined set of parameters; and

"Option 3": User selects to employ "intelligent paths";

Eighth step 8035A wherein the user has selected "Option 1" wherein the software application and/or one or more brush engines automatically calculate the parameters and proceeds to third Sub-Flow 8000C;

Fourth step 8035B wherein the user has selected "Option 2" electing to select a pre-determined set of parameters wherein these are selected by the user, for example, from a drop-down menu or other menu method known the art allowing them to select the pre-determined set of parameters which may be a set defined by the software application, a set previously defined by the user, or a set purchased from a third party where these may be listed using mnemonic, nicknames, etc. such as "leaves", "waves", "warping", "grass", etc. Once selected the process proceeds to third Sub-Flow 8000C; and Fifth step 8035C wherein the user elects to employ "intelligent paths" which are described elsewhere and not repeated here for brevity after which the process proceeds to third Sub-Flow 8000C.

Third Sub-Flow 8000C comprises eleventh to sixteenth steps 8040 to 8060 respectively, these comprising:

Eleventh step 8040 wherein the user is prompted as to whether they wish to add an additional point or points wherein if they do the process continues within third Sub-Flow 8000C with twelfth step 8045 otherwise it exits the third Sub-Flow 8000C and proceeds to sixteenth step 8060;

Twelfth step 8045 wherein the user specifies the additional point for the stroke tapestry to be generated;

Thirteenth step 8050 wherein the user is prompted to select a sub-process for establishing the parameters of the start point, which are depicted in this exemplary process flow as being 3 options, which similarly:

"Option 1": Allow the software application and/or one or more brush engines to automatically calculate the parameters;

"Option 2": User selection of a pre-determined set of parameters; and

"Option 3": User selects to employ "intelligent paths";

Fourteenth step 8055A wherein the user has selected "Option 1" wherein the software application and/or one or more brush engines automatically calculate the parameters and proceeds back to eleventh step 8040;

Fourth step 8035B wherein the user has selected "Option 2" electing to select a pre-determined set of parameters wherein these are selected by the user, for example, from a drop-down menu or other menu method known the art allowing them to select the pre-determined set of parameters which may be a set defined by the software application, a set previously defined by the user, or a set purchased from a third party where these may be listed using mnemonic, nicknames, etc. such as "leaves", "waves", "warping", "grass", etc. Once selected the process proceeds back to eleventh step 8040; and Fifth step 8035C wherein the user elects to employ "intelligent paths" which are described elsewhere and not repeated here for brevity after which the process proceeds back to eleventh step 8040.

Seventeenth step 8060 wherein the one or more brush engines execute the stroke tapestry.

Within sixth step 8025 in contrast to other embodiments of the invention the user may select multiple end-points such that, for example, they can create a stroke tapestry which radiates from the start point to the multiple end points. Within other embodiments of the invention the user may alternatively select a set of start point/end point combinations and apply the same stroke tapestry to these simultaneously or sequentially if user interaction with the stroke tapestry generation is required by the user.

Within the second and third Sub-Flows 8000B and 8000C as described and depicted for the end point and the additional points the user is given the same options for defining the parameters to employ at the end point. Accordingly, a user may elect to start with a pre-defined set of parameters "water" but transition to "stones" by the end point for example. Within other embodiments of the invention the user may, upon making one selection for the start point be presented with a sub-set of the options for the end point and/or additional point(s) or with other options for the end point and/or additional point(s).

Figure 9:
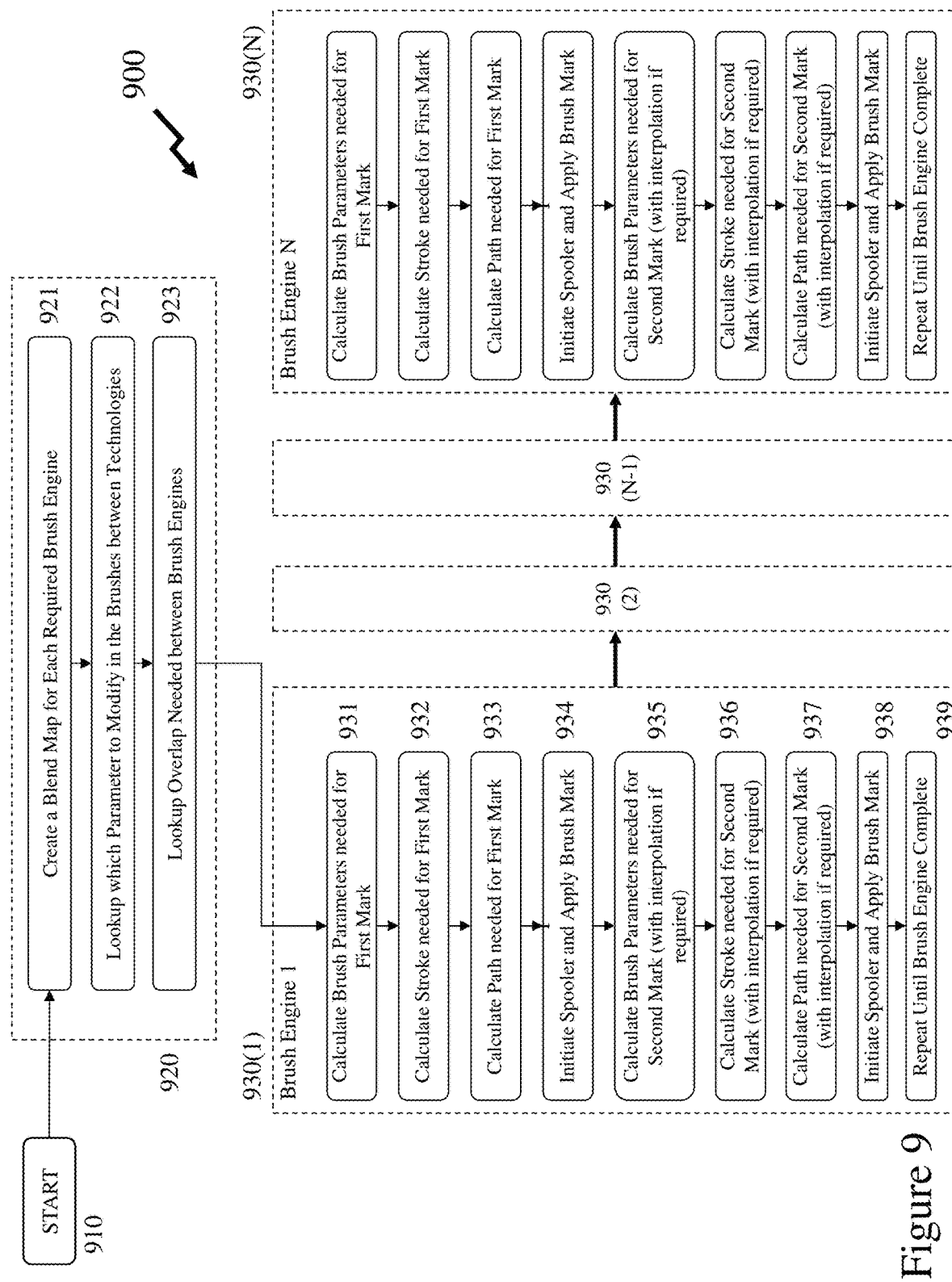
FIGS. 9 and 10 depict exemplary process flows for a software application providing a stroke tapestry feature employing multiple brush engines according to embodiments of the invention.
Figure 10:
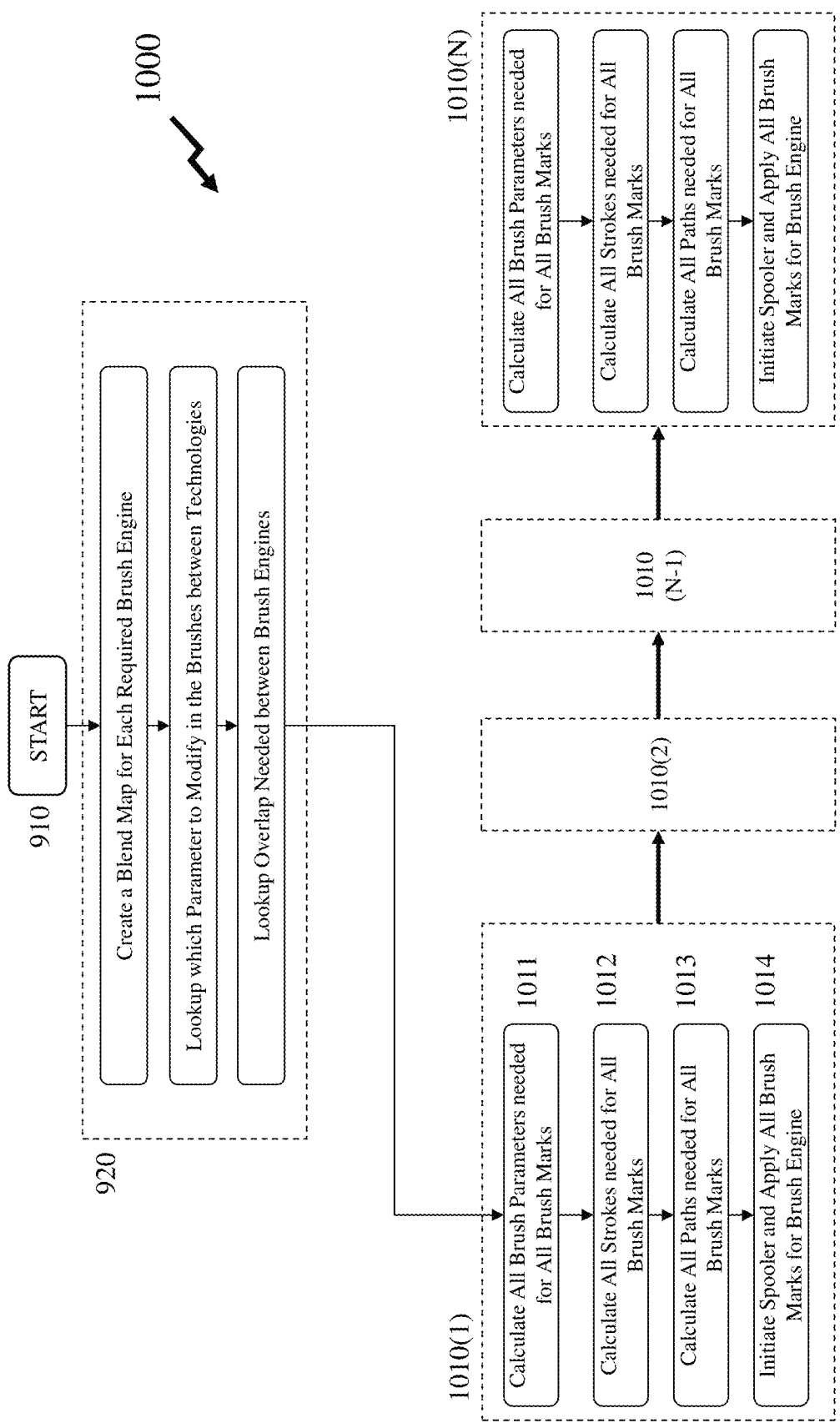

Now referring to FIGS. 9 and 10 there are depicted exemplary Process Flows 900 and 1000 for a software application providing a stroke tapestry feature employing multiple brush engines according to embodiments of the invention. Referring initially to Process Flow 900 then the process starts at step 910 before progressing to Blend Creation 920 and therein to first Sub-Flow 930(1) and therein to $N^{th}$ Sub-Flow 930(N) via intermediate Sub-Flows 930(2) to 930(N−1). Whilst FIG. 9 depicts the scenario where N=4 it would be evident that N may be an integer and N≥2.

Blend Creation 920 as depicted comprising first to third steps 921 to 923, these comprising:

First step 921: Create a Blend Map for Each Required Brush Engine

Second step 922: Lookup which Parameter to Modify in the Brushes between Technologies; and Third step 923: Lookup Overlap Needed between Brush Engines.

Once the Blend Creation 920 step has been completed then the Process Flow 900 proceeds to first Sub-Flow 930(1) before proceeding to $N^{th}$ Sub-Flow 930(N) via intermediate Sub-Flows 930(2) to 930(N−1). As depicted first Sub-Flow 930(N) and $N^{th}$ Sub-Flow 930(N) each comprise the same sequence of steps, these being first to ninth Sub-Flow Elements 931 to 939, respectively. These comprising:

First Sub-Flow Element 931: Calculate Brush Parameters needed for First Mark;

Second Sub-Flow Element 932: Calculate Stroke needed for First Mark;

Third Sub-Flow Element 933: Calculate Path needed for First Mark;

Fourth Sub-Flow Element 934: Initiate Spooler and Apply Brush Mark;

Fifth Sub-Flow Element 935: Calculate Brush Parameters needed for Second Mark (with interpolation if required);

Sixth Sub-Flow Element 936: Calculate Stroke needed for Second Mark (with interpolation if required);

Seventh Sub-Flow Element 937: Calculate Path needed for Second Mark (with interpolation if required);

Eighth Sub-Flow Element 938: Initiate Spooler and Apply Brush Mark; and

Ninth Sub-Flow Element 939: Repeat Until Brush Engine Complete.

Alternatively, the user may select a predetermined set of parameters thereby triggering Process Flow 1000, which as depicted comprises step 910 and Blend Creation 920 as described with respect to Process Flow 900 in FIG. 9 and then proceeds to first Brush Engine Sub-Flow 1010(1) and therein to $N^{th}$ Brush Engine Sub-Flow 1010(N) via intermediate Brush Engine Sub-Flows 1010(2) to 1010(N−1). Whilst FIG. 9 depicts the scenario where N=4 it would be evident that N may be an integer and N≥2.

Each Brush Engine Sub-Flow comprising first to fourth steps 1011 to 1014 for its respective Brush Engine M, where 1≤M≤N. First to fourth steps 1011 to 1014 comprising:

First step 1011: Calculate All Brush Parameters needed for All Brush Marks;

Second step 1012: Calculate All Strokes needed for All Brush Marks;

Third step 1013: Calculate All Paths needed for All Brush Marks; and

Fourth step 1014: Initiate Spooler and Apply All Brush Marks for Brush Engine.

Within FIGS. 9 and 10 a blend map is described which is employed by each brush engine when two or more brush engines are employed to render the stroke tapestry. Within an embodiment of the invention these blend maps for each brush engine may be derived from a master blend map which is established initially and defines the parameters for each brush engine. Within embodiments of the invention if N brush engines are established to generate the stroke tapestry then the master blend map may be divided into N regions where these regions are equal in some parameter, e.g. width, height, area, etc. or they may unequal. Accordingly, if, for example, the density of brush strokes is to vary from dense to light then the brush engines may be assigned based upon segmenting the master blend map for an approximately constant number of brush strokes to be generated/rendered for each brush engine. The master blend map may, within embodiments of the invention, be segmented to the individual blend maps based upon one or more rules established within the software application generally which define how the master blend map and/or individual blend maps are to be generated. Alternatively, the rule or rules may be associated with a predetermined set of parameters for generating a specific stroke tapestry, e.g. applying an effect entitled "grass" may not only define the parameters of the stroke tapestry but also how a blend map is generated and applied to multiple brush engines. Similarly, if a third party "effect" is purchased then in addition to the parameters this may purchased effect may include the rules for how a blend map is generated and applied to multiple brush engines.

Figure 16:
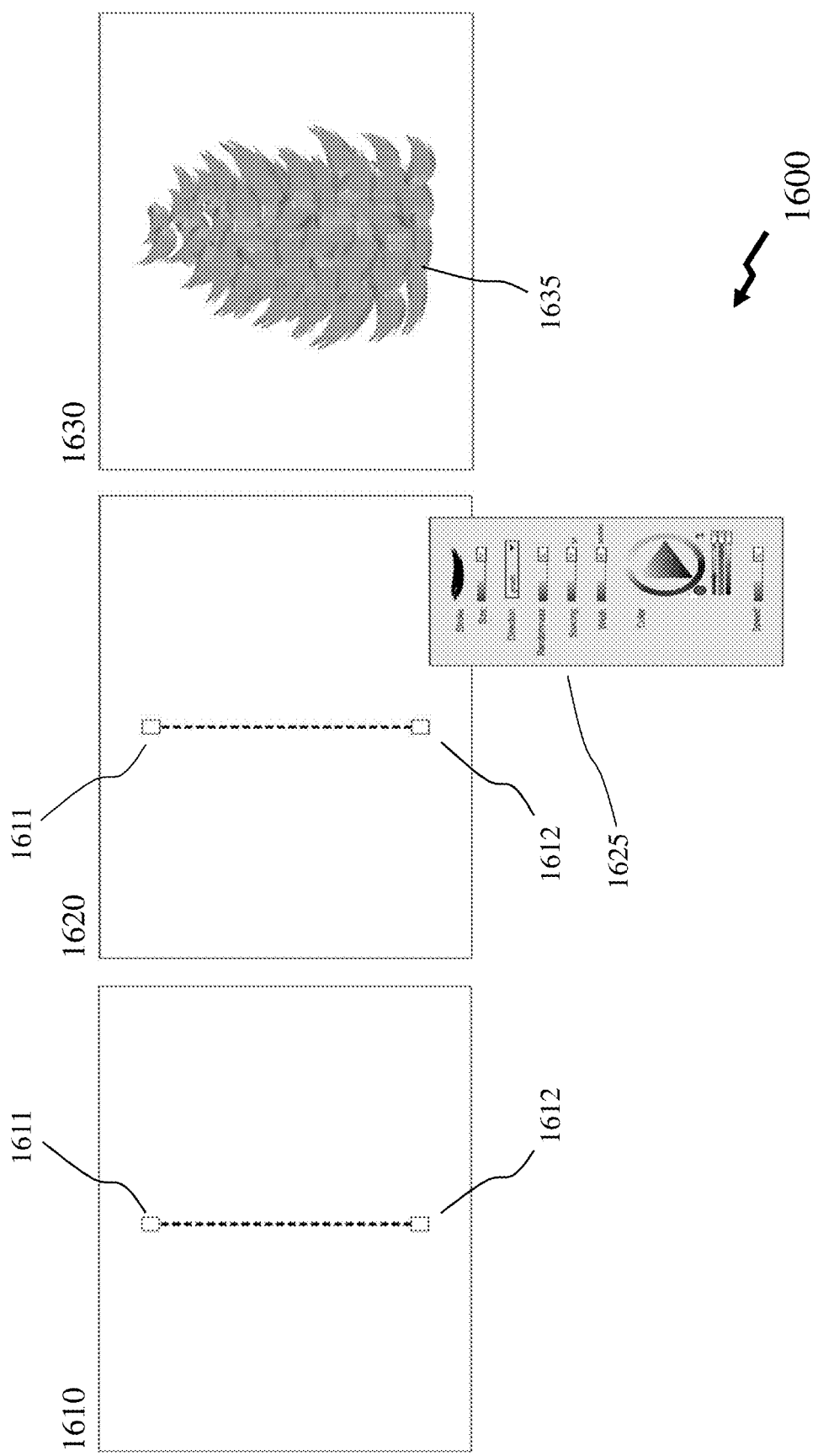
FIG. 16 depicts an exemplary sequence of a stroke tapestry feature of a software application with drag out direction/orientation and user selection of options for each node according to an embodiment of the invention where the software application generates brush strokes with randomness and growth.
Figure 17:
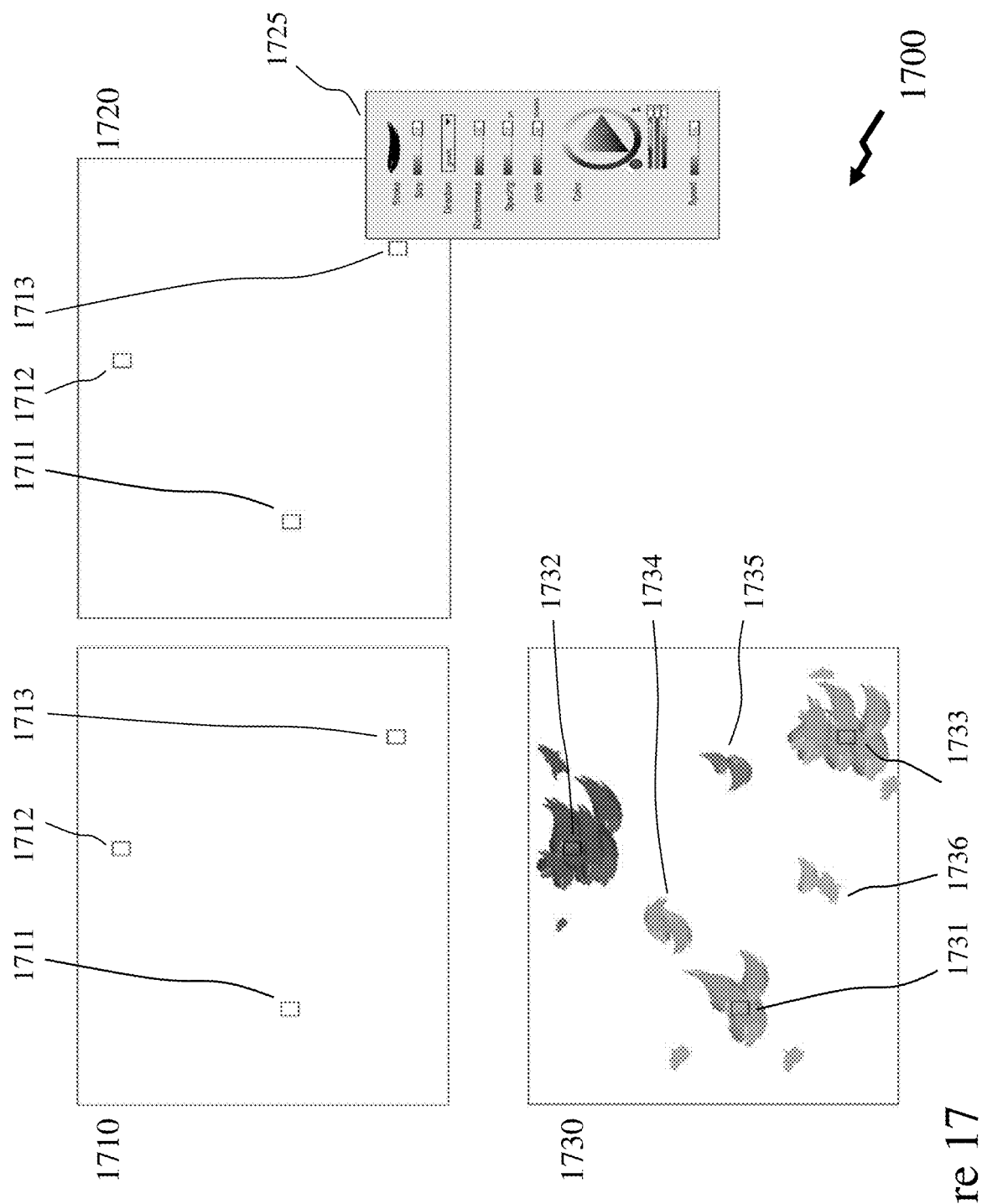
FIG. 17 depicts an exemplary sequence of a stroke tapestry feature of a software application with drag out direction/orientation and user selection of options for each node as well as well as whether the process is linear, random per node or random per stroke according to an embodiment of the invention with multiple nodes where the software application generates brush strokes at each node slowly filling the area.

Within the images FIGS. 11 to 15 and 18 to 20 described below depicting embodiments of the invention the stroke generated by the stroke tapestry engine are depicted in rows/columns with regular pattern where the randomness of the stroke tapestry engine has been set to zero for clarity of depiction. FIGS. 16 and 17 depict results with a randomness of 50 rather than 0 indicate how additional realism may be introduced into the painting by applying a randomness to the positioning of the strokes. Similarly, the Control GUI 100D in FIG. 1D and subsequent depictions represent a simple control GUI for the parameters of a stroke tapestry engine according to embodiments of the invention. However, it would be evident that through randomness of either position, count, size, etc. as well as other aspects of stroke rendering such as jitter within a stroke etc. may result in the strokes varying relative to one another within the stroke tapestry. Such aspects being omitted from the Figures for clarity of presenting the stroke tapestry engine but may be applied through a more extensive control GUI or multiple control GUIs to apply such aspects to the generated strokes. Further, during generation the stroke engine may take user input, e.g. gesture characteristics, expressions etc., such that user directed variations are introduced discretely or in combination with pseudo-random ones generated by the stroke tapestry engine.

Figure 11:
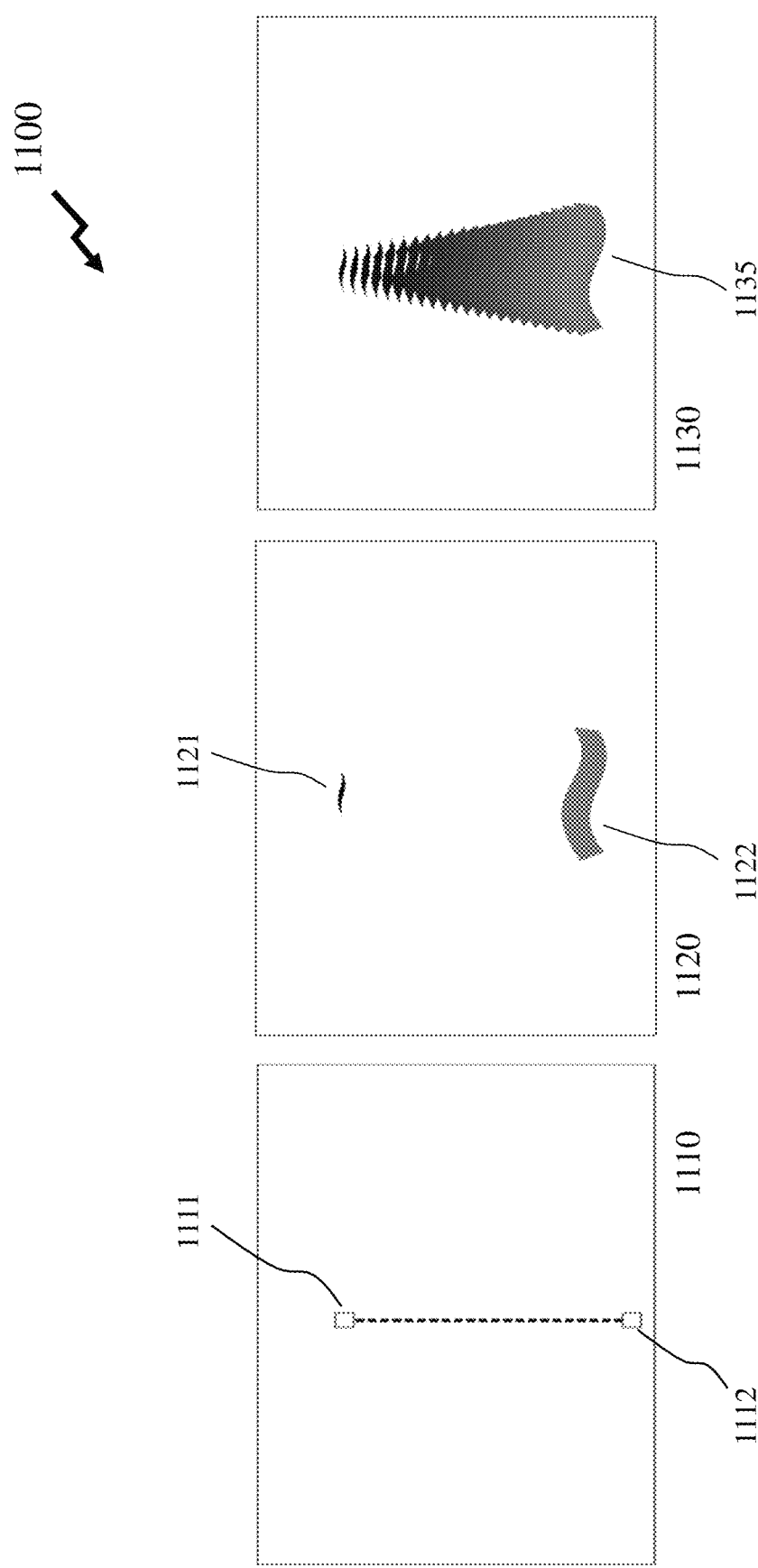
FIG. 11 depicts an exemplary sequence of a stroke tapestry feature of a software application with a basic path and two strokes to interpolate from according to an embodiment of the invention.

Now referring to FIG. 11 there is depicted an exemplary sequence of a stroke tapestry feature of a software application with a basic path and two strokes to interpolate from according to an embodiment of the invention. Accordingly, in first image 1110 the user is defining a basic path from start point 1111 to end point 1112. As described and depicted in respect of Control GUI 100D in FIG. 1D either before or after defining each of the start point 1111 and end point 1112 the user can define the stroke at each. These accordingly being depicted in second image 1120 with start stroke 1121 and end stroke 1122. Accordingly, the stroke tapestry engine using the parameters set by the user proceeds to interpolate color, shape etc. and generates stroke tapestry result 1135 in third image 1130.

Figure 12:
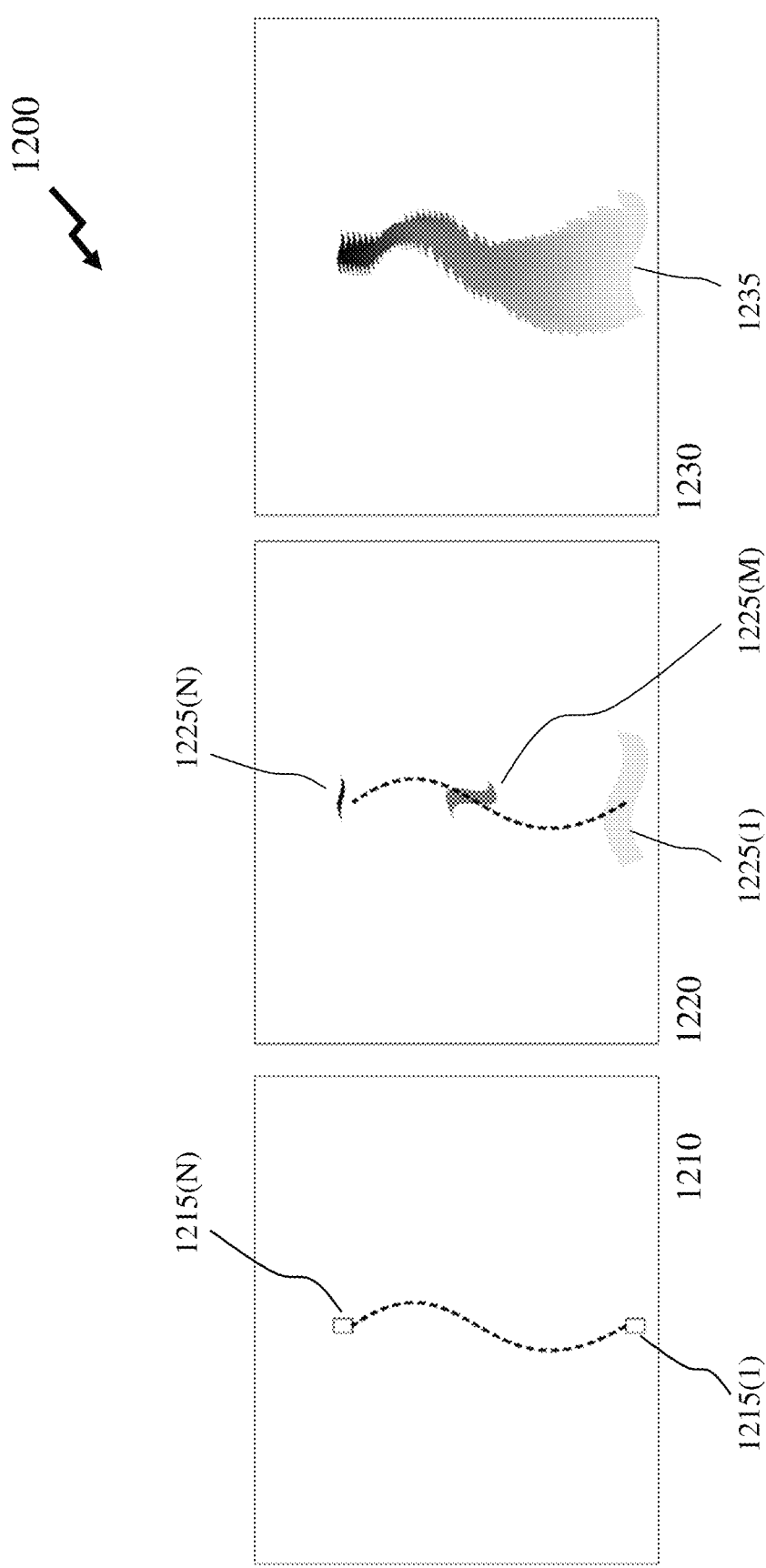
FIG. 12 depicts an exemplary sequence of a stroke tapestry feature of a software application with multiple point non-linear path and three strokes to interpolate from according to an embodiment of the invention.

Now referring to FIG. 12 there is depicted an exemplary sequence of a stroke tapestry feature of a software application with a non-linear path defined with multiple points and multiple strokes to interpolate from according to an embodiment of the invention. Accordingly, in first image 1210 the user is defining a basic path from start point 1215(1) to end point 1215(N). As described and depicted in respect of Control GUI 100D in FIG. 1D either before or after defining each of the start point 1215(1), the end point 1215(N) and intermediate point the user can define the stroke at each point, these being depicted as first to third strokes 1225(1)

for the stroke at start point, 1225(M) for the intermediate stroke, and 1225(N) for the stroke at the end point. Accordingly, the stroke tapestry engine using the parameters set by the user proceeds to interpolate color, shape etc. and generates stroke tapestry result 1235 in third image 1230.

Figure 13:
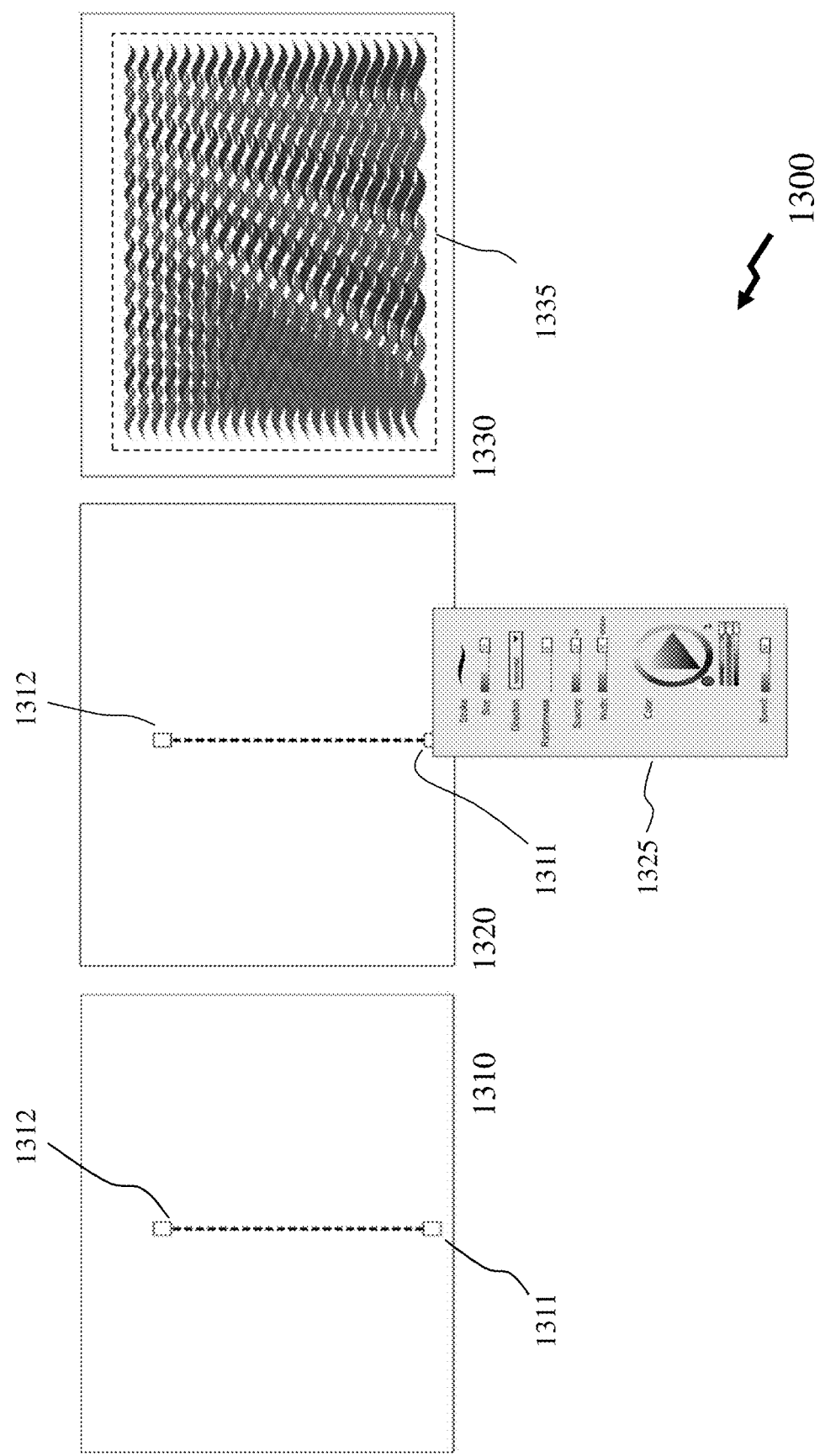
FIG. 13 depicts an exemplary sequence of a stroke tapestry feature of a software application with drag out direction/orientation and user selection of options for each node according to an embodiment of the invention where the software application generates brush strokes from one end to the other.

Now referring to FIG. 13 there is depicted an exemplary sequence of a stroke tapestry feature of a software application with drag out direction/orientation and user selection of options for each node according to an embodiment of the invention. Accordingly, in first image 1310 the user is defining a basic path from start point 1311 to end point 1312. As described and depicted in respect of Control GUI 100D in FIG. 1D either before or after defining each of the start point 1311 and 1312 the user can define the stroke at each as represented by GUI 1325 in second image 1320. Accordingly, the stroke tapestry engine using the parameters set by the user proceeds to interpolate color, shape etc. and generates stroke tapestry result 1335 in third image 1330 wherein the GESGEAP has drawn the tapestry 1335 across the width of the document with strokes.

Figure 14:
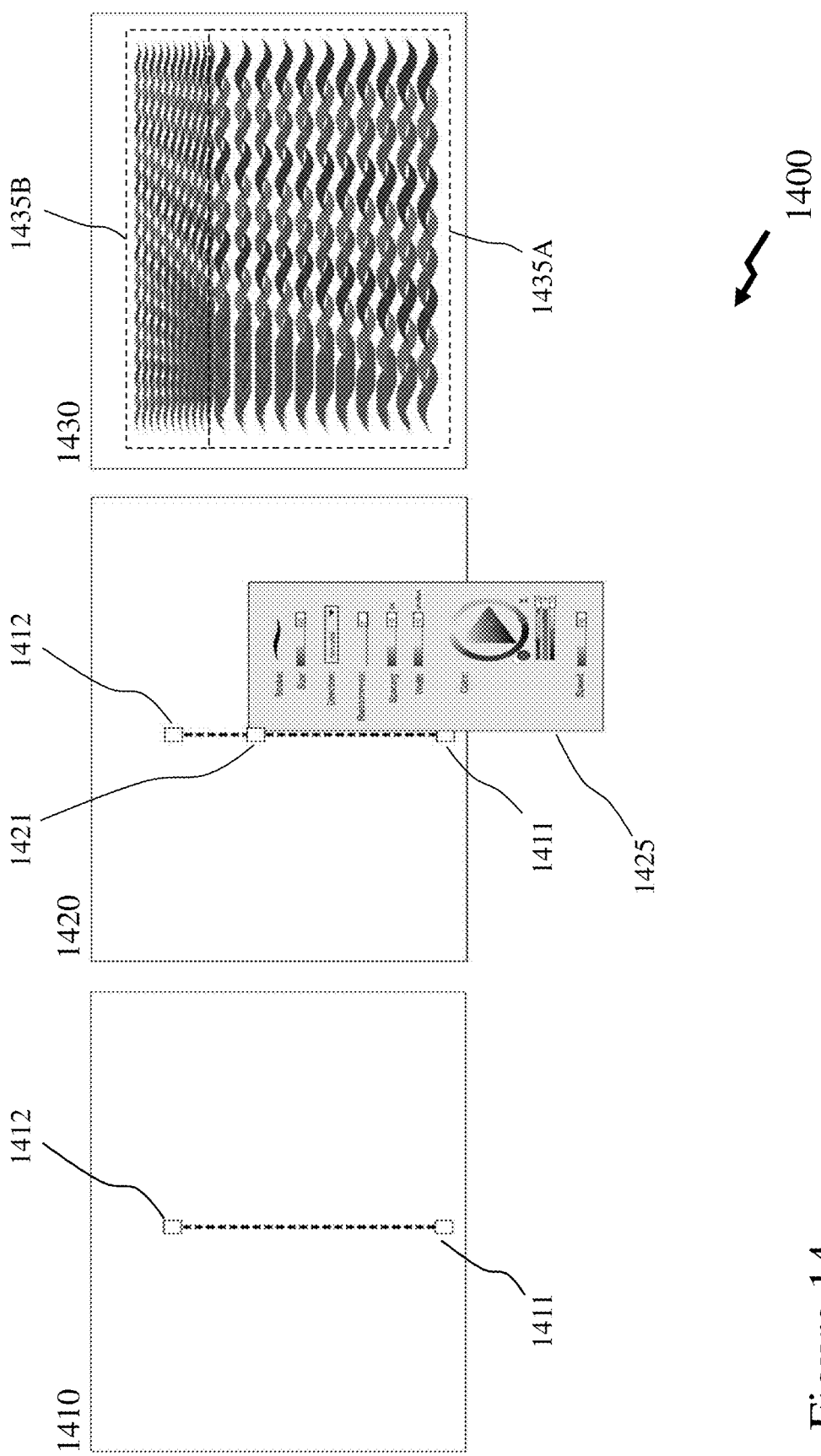
FIG. 14 depicts an exemplary sequence of a stroke tapestry feature of a software application with drag out direction/orientation and user selection of options for each node according to an embodiment of the invention with multiple nodes where the software application generates brush strokes from one end to the other.

Referring to FIG. 14 there is depicted an exemplary sequence of a stroke tapestry feature of a software application with drag out direction/orientation and user selection of options for each node according to an embodiment of the invention with multiple nodes where the software application generates brush strokes from one end to the other. Accordingly, in contrast to FIG. 13 the user has now specified start and end points 1411 and 1412 respectively in first image 1410 before adding an intermediate point 1421 in second image 1420 and setting the parameters via GUI 1425. Accordingly, the stroke tapestry engine using the parameters set by the user proceeds to interpolate color, shape etc. and generates stroke tapestry result in third image 1430 wherein the GESGEAP has drawn the tapestry across the width of the document with strokes but now due to the different settings the tapestry comprises a lower section 1435A with a wider spacing between sequential rows than that in upper section 1435B.

Figure 15:
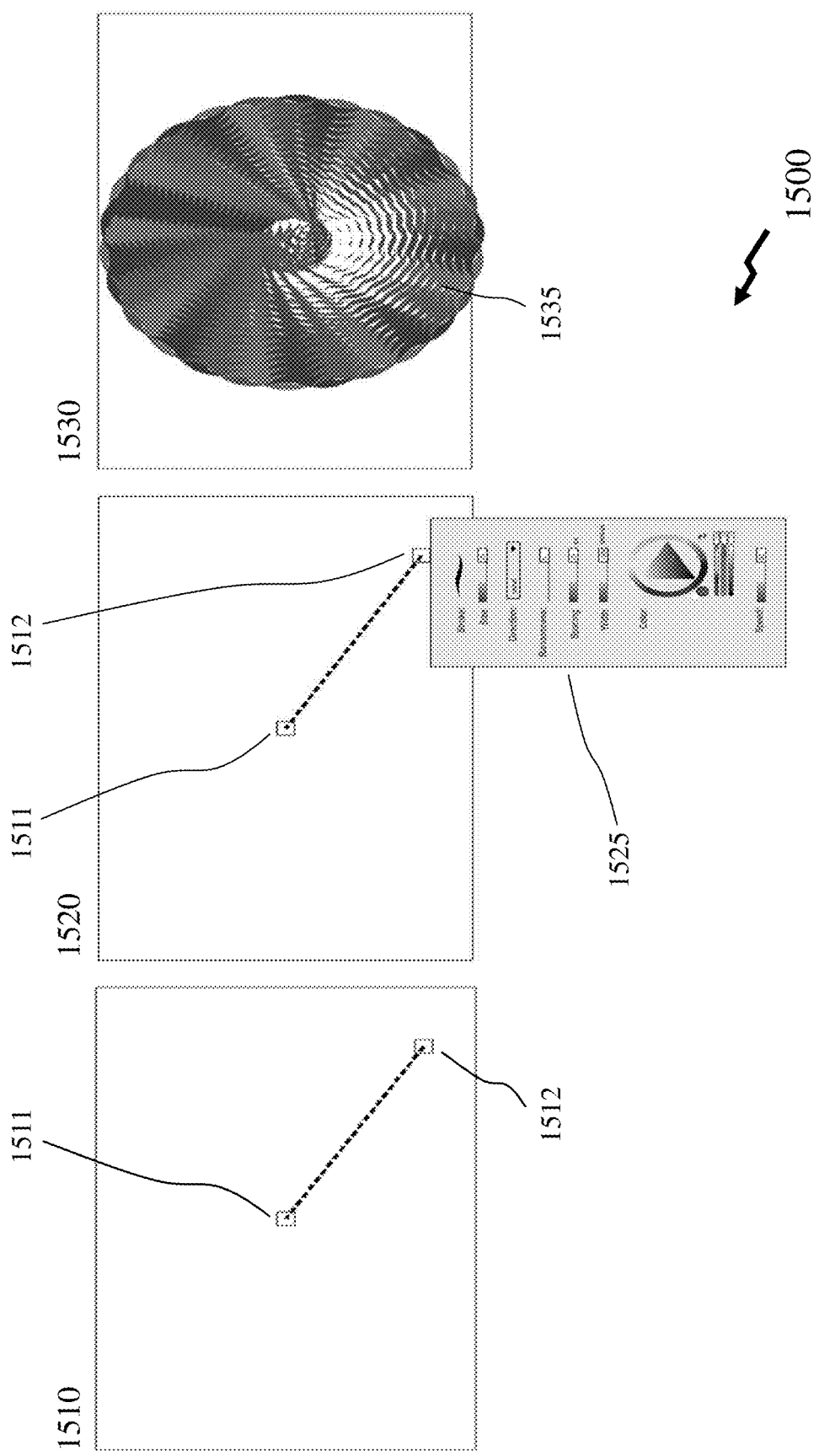
FIG. 15 depicts an exemplary sequence of a stroke tapestry feature of a software application with drag out direction/orientation and user selection of options for each node according to an embodiment of the invention where the software application generates brush strokes radiating out.

Now referring to FIG. 15 there is depicted an exemplary sequence of a stroke tapestry feature of a software application with drag out direction/orientation and user selection of options for each node according to an embodiment of the invention where the software application generates brush strokes radiating out. Accordingly, in first image 1510 the user establishes a path comprising start point 1511 and end point 1512, e.g. by two discrete point selection actions or through a select-and-drag action. Then in second image 1520 the user via Control GUI 1525 defines the parameters for the stroke tapestry which is then executed by the stroke tapestry engine resulting in third image 1530 wherein the stroke tapestry 1535 has been generated. In this instance rather than "horizontal" as selected previously in FIGS. 11 to 14 the user has now selected "radial" for the direction selector. Within third image 1530 the stroke tapestry 1535 exceeds the document boundary. This may, for example, be such that user can subsequently manipulate the stroke tapestry within the document or that the region of the document currently being viewed is part of the overall document, for example.

Referring to FIG. 16 there is depicted an exemplary sequence of a stroke tapestry feature of a software application with drag out direction/orientation and user selection of options for each node according to an embodiment of the invention where the software application generates brush strokes with randomness and growth. Accordingly, in first image 1610 the user establishes a path comprising start point 1611 and end point 1612, e.g. by two discrete point selection actions or through a select-and-drag action. Then in second image 1620 the user via Control GUI 1525 defines the parameters for the stroke tapestry which is then executed by the stroke tapestry engine resulting in third image 1630 wherein the stroke tapestry 1635 has been generated. In this instance rather than "horizontal" as selected previously in FIGS. 11 to 14 or "radial" in FIG. 15 the user has now selected "growth" for the direction selector. Accordingly, it is evident how the stroke tapestry feature by appropriate selection of stroke and points/parameters can rapidly automatically generate an element of a document, in this instance an element resembling a tree.

Now referring to FIG. 17 there is depicted an exemplary sequence of a stroke tapestry feature of a software application with drag out direction/orientation and user selection of options for each node as well as whether the process is linear, random per node or random per stroke according to an embodiment of the invention with multiple nodes where the software application generates brush strokes at each node slowly filling the area. Accordingly, in first image 1710 the user has selected a series of points, first to third points 1711 to 1713, prior to establishing the settings for the stroke tapestry engine with Control GUI 1725 in second image 1720. For example, the user may choose the options per node or for all nodes at once as well as establishing whether, for example, the process is linear, random per node, or random per stoke. Accordingly, around first point 1711 the stroke tapestry engine starts applying strokes to form first region 1731, strokes to form second region 1732 around second point 1712, and strokes to form third region 1733 around third point 1713. However, as the stroke tapestry engine paints at each node it also starts filling the intermediate area between these points. Accordingly:

fourth region 1734 begins with a colour graded between that selected for first point 1711 and second point 1712;
   fifth region 1735 begins with a colour graded between that selected for second point 1712 and third point 1713;
   sixth region 1736 begins with a colour graded between that selected for first point 1711 and third point 1713.

Accordingly, with more points more complex regions to fill automatically with the stroke tapestry engine can be defined.

Figure 18:
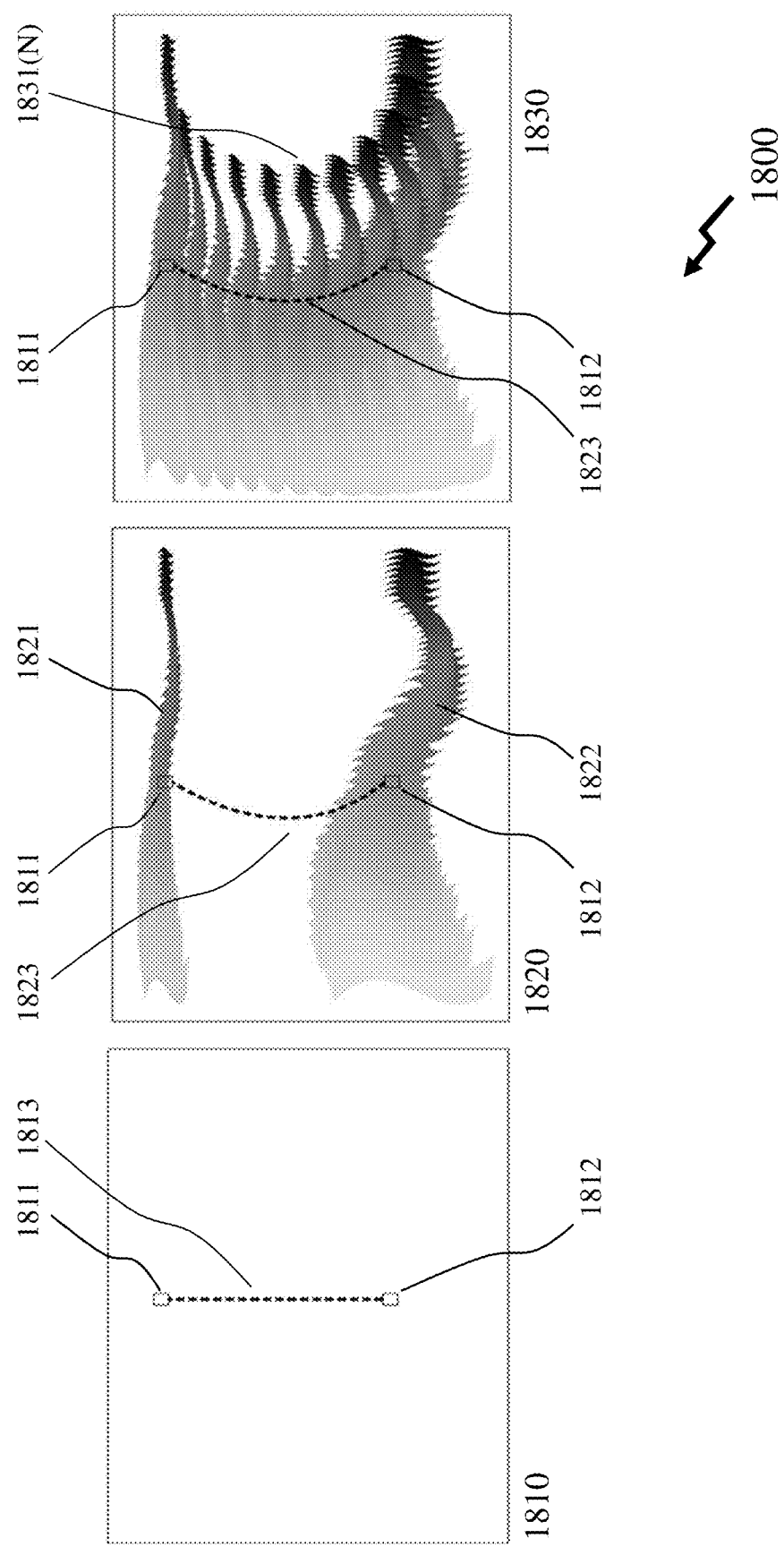
FIG. 18 depicts an exemplary sequence of a stroke tapestry feature of a software application with drag out direction/orientation and user selection of options where the user edits the path shape and adds request for randomness according to an embodiment of the invention where the software application generates brush strokes along the altered path.

Referring FIG. 18 there is depicted an exemplary sequence of a stroke tapestry feature of a software application with drag out direction/orientation and user selection of options where the user edits the path shape and adds request for randomness according to an embodiment of the invention where the software application generates brush strokes along the altered path. Accordingly, the user initially selects a path 1813 from start point 1811 to end point 1812 in first image 1810 and applies a shape, depicted as start shape 1821 and end shape 1822 in second image 1820. However, the user also adjusts the path, e.g. by clicking and selecting a function or clicking-and-dragging for example, to yield modified path 1823. The results is a series of intermediate shapes (strokes) 1831(N) which transition from the start shape 1821 to end shape 1823 along the modified path 1823.

Figure 19:
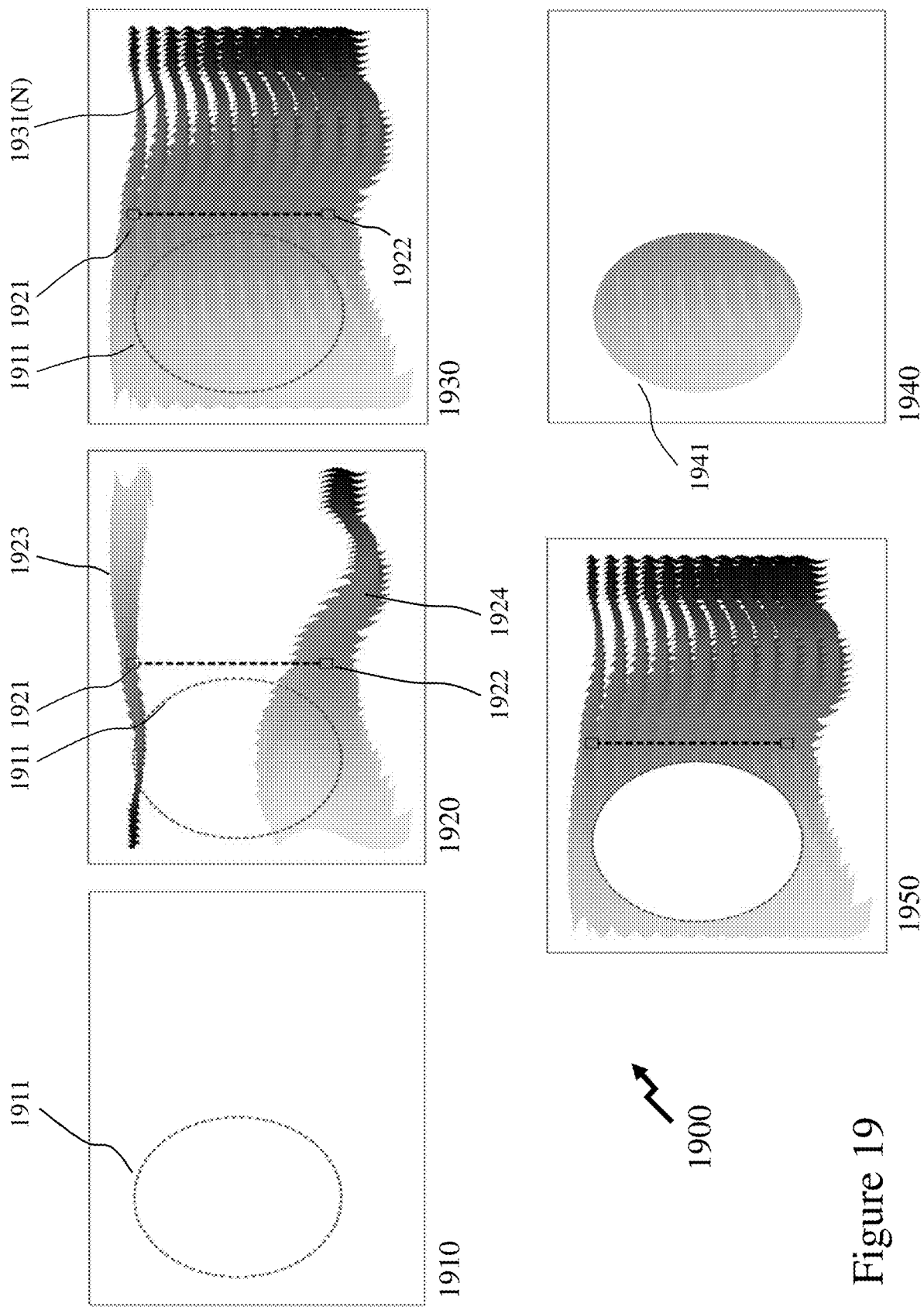
FIG. 19 depicts an exemplary sequence of a stroke tapestry feature of a software application with a user selecting two multi-stroke features to interpolate with a created selection according to an embodiment of the invention where the software application interpolates the multi-stroke features for colour and geometry before painting only that portion of the generated stroke tapestry within the created selection.

Now referring to FIG. 19 there is depicted an exemplary sequence of a stroke tapestry feature of a software application with a user selecting two multi-stroke features to interpolate with a created selection according to an embodiment of the invention where the software application interpolates the multi-stroke features for colour and geometry before painting only that portion of the generated stroke tapestry within the created selection. Accordingly, in first image 1910 a user creates a region 1911. Then in second image 1920 the user defines a path from start point 1921 with start stroke (or shape, tool mark, image etc.) 1923 to end point 1922 with end stroke 1924 (or shape, tool mark, image etc.). The stroke tapestry engine generates as depicted in third image 1930 the multiple strokes 1931(N) before these are cropped by the region 1911 as depicted in fourth image 1940 so that only that portion within the region 1911 is maintained. Optionally, region 1911 may be an exclusion region such that the tapestry is generated and maintained over the remainder of the document where it is generated and the exclusion region is not filled such as depicted in fifth image 1950.

Figure 20:
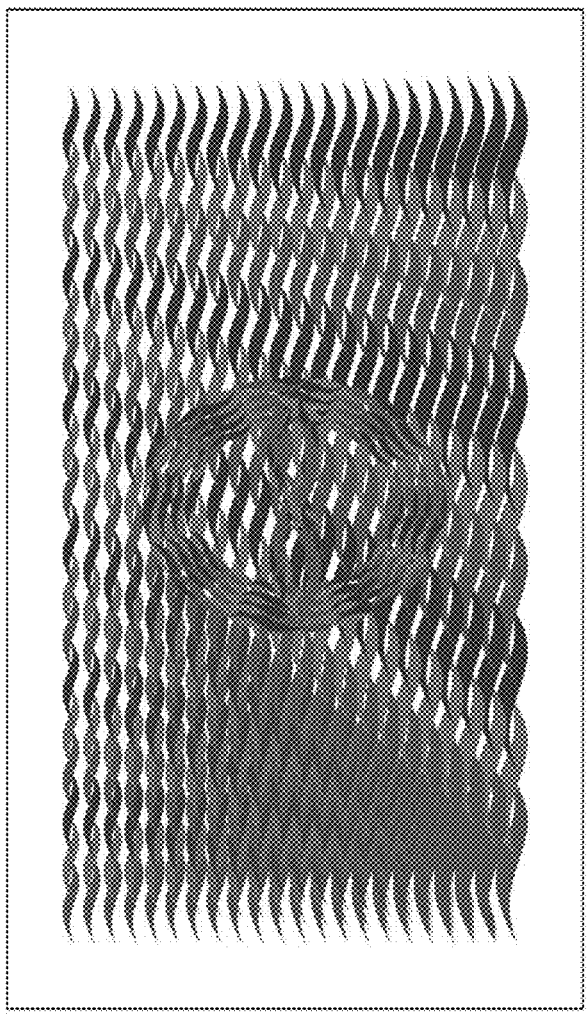
FIG. 20 depicts an exemplary rendered image via a stroke tapestry feature of a software application according to an embodiment of the invention where an intelligent stroke feature finds edges within underlying rendered content and follows these edges.

Referring to FIG. 20 there is depicted an exemplary rendered image via a stroke tapestry feature of a software application according to an embodiment of the invention where an intelligent stroke feature finds edges within underlying rendered content and follows these edges. Accordingly, an exemplary process such as described and depicted in FIG. 13 is performed by the region being filled with the stroke tapestry has underlying content associated with it, e.g. a texture, flow map, image or other content. Accordingly, as the stoke tapestry engine generates the stroke tapestry it processes the underlying content, in this instance a simple graphic of a face, defining edges within the underlying content such that the stroke tapestry engine overrides the settings for a horizontal brush stroke set and follows these edges. Optionally, these may be contours defined within the underlying content, or a flow map/texture defining a graded pattern of features which are employed. Accordingly, the user when defining the stroke tapestry can select a different layer, for example, within the document to provide the underlying content. Optionally, the underlying content by not selecting this layer, for example, is not rendered in the final image.

Figure 21:
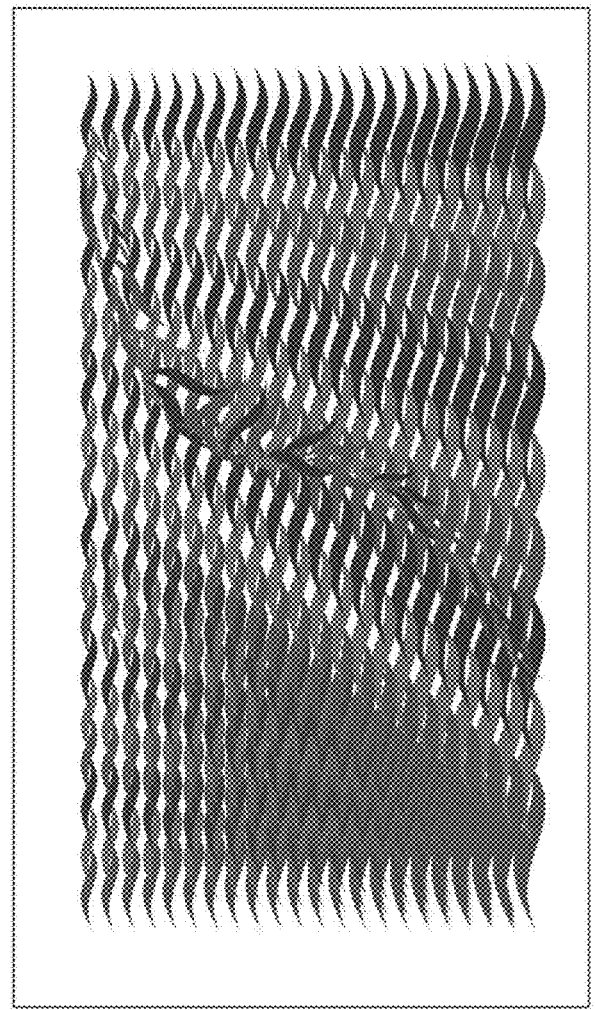
FIG. 21 depicts an exemplary rendered image via a stroke tapestry feature of a software application according to an embodiment of the invention where an intelligent stroke feature enabled the user to interact with the strokes being generated thereby adjusting the rendered stroke tapestry, in this instance to render a ripple of strokes along a path.

Now referring FIG. 21 there is depicted an exemplary rendered image via a stroke tapestry feature of a software application according to an embodiment of the invention where an intelligent stroke feature enabled the user to interact with the strokes being generated thereby adjusting the rendered stroke tapestry, in this instance to render a ripple of strokes along a path. In this instance the user may have set the speed of the stroke tapestry engine to a low value so that the stroke tapestry engine generates and renders the stroke tapestry at a speed the user is comfortable working with. Accordingly, as the stroke tapestry engine has progressed the user is able to interact with the stroke tapestry, e.g. through a user interface, such that the stroke tapestry engine adjusts in response to the user inputs. In the example depicted in FIG. 21 the user has executed an s-shaped stroke from bottom left (assuming the stroke tapestry engine started at the bottom) to the top right. A user interface may include, but not be limited to, a stylus, mouse, and touchpad. The user may be able to select the result or select to re-execute and apply a new stroke as they were unhappy with their initial attempt. Optionally, the user may select the result and have the stroke tapestry engine regenerate from this generated stroke tapestry with their initial stroke to modify it based upon one or more subsequent strokes.

It would be evident that the multiple aspects described and depicted in FIGS. 11 to 21 represent a subset of the features and techniques that can be applied individually or in different combinations.

If a user has enabled what the inventor refers to as "intelligent paths" then the portion of the stroke tapestry engine that calculates paths is automatically altered. For example, an intelligent path may exploit a pre-existing path defined by the user. This may be viewed as an extension of a "recorded stroke" wherein a user creates a stroke on a document and saves the stroke data for subsequent use. In one variant the "intelligent path" takes the recorded stroke and generates a path from it to which the selected stroke or strokes are applied. In another variant the stroke defines the area rather than just a path. For example, a recorded stroke generated using a large calligraphy brush defines an overall shape to which the stroke tapestry may be applied as the recorded stroke now defines the start and end points as well as width/stroke direction.

Alternatively, the intelligent path may exploit "smart strokes' wherein the software application finds edges in an image that is part of the document which may or may not be visible and defines the geometry of the stroke tapestry in dependence upon the found edges.

Alternatively, the intelligent path may exploit "saliency" wherein the stroke tapestry engine processes content of the document on the same layer and/or on one or more other layers specified, to define the path (what the inventors refers to as a "salient" path where this may be defined by processing the content to define "regions of interest." These may, for example, be defined through the application of one or more image processing algorithms, or another intelligent mapping technology, which allow the use of image maps to determine area to be filled.

If the user has enabled what the inventor refers to as 'interactive strokes' are enabled, then stroke path calculations are performed as described above although the user can interrupt the spooler by creating new coordinates in real-time, e.g. X,Y coordinates, as well as generating data such as pressure (Z) tilt/bearing etc. The user can influence the strokes in either a linear, or non-linear way. If, for example, a user asks for a position well outside of the current position, the spooler may choose a point half-way in between the request, directly beneath the request, or only a small difference away from the request. The spooler may routinely poll the user input for new locations, and if no new updates are provided, it returns to the routine stored in memory.

Within the preceding description reference has been made primarily to linear or two or more node-based interactions, however this can easily be expanded on by offering a node interaction anywhere on the document space, with each node having parameters specified and the engine interpolating between nodes. In this 'spatial node' embodiment, the processing of nodes can be in the order added by the user, or some random order of nodes, or even random strokes chosen between nodes.

Accordingly it would be evident that the embodiments of the invention described and depicted above with respect to FIGS. 1A to 21 may provide users with:

An ability to fill large areas with little effort wherein as the medium, e.g. paint, is actually "applied", it will have all the important aesthetics of real brush strokes including, but not limited to, variance in size, opacity, paper grain, blending etc. as opposed to other filter, style transfer, or generative stroke methods.

Provide users with a means to eliminate 'blank canvas syndrome' where a user may run the tool to start a new painting. This issue is common with many digital users as that giant blank document can be very intimidating. By applying some random colors or strokes, users may be inspired to create or they may find interesting shapes or patterns within the applied paint and start to create for themselves.

Provide users with a technology could enhance a workflow, e.g. a photo art workflow, whereby brush strokes have color and or pixels sampled from a source image.

The advantage over existing photo art workflow is that it can offer the user a choice somewhere between autopainting where strokes are added quickly with very little control, and painting strokes by hand, which can be very time consuming.

Stroke placement can be more precise than human placement, or very un-precise, with natural-looking randomness, and the user can choose this before or during the painting process.

The available "strokes" and "tapestry patterns" can be templates or user defined. Templates may for example provide for the strokes to appear as waves, leaves, etc. or abstract patterns like fractals or Perlin noise. The user can select this pattern and how the strokes apply within this pattern from one area to another.

Specific areas or shapes can be "painted", thus adding the ability to generate both real-world and abstract elements of the artwork being created.

Where very precise shaping is needed, stroke tapestry can work with other tools within the GESGEAPs such as object selection, colour selection, geometry selection, etc.

For some users, this may provide an entirely new workflow. For example, the stroke tapestry engine could be setup to randomly add nodes and strokes at a certain speed, and the user would strategically sculpt and shape the paint as it applied, akin to pressing on spinning clay or blowing around snowflakes in an entirely novel, playful experience.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. Computer executable instructions stored upon a non-volatile, non-transitory storage medium where the executable instructions when executed by one or more processors of a system configure the system to execute a process comprising:
    establishing in dependence upon user input a first point within a document opened upon the system;
    establishing in dependence upon further user input a second point within the document;
    establishing in dependence upon additional user input one or more stroke parameters to apply to rendering content at least one of the first point and the second point; and
    executing a stroke tapestry engine to generate a stroke tapestry for rendering upon a display associated with the system; wherein
    the stroke tapestry comprises a plurality of brush strokes automatically generated by the stroke tapestry engine along a path established between the first point and the second point;
    the plurality of brush strokes transition from one or more first marks at the first point to one or more second marks at the second point in dependence upon the one or more stroke parameters; and
    the stroke tapestry engine executes a process comprising:
        a) calculating brush parameters needed for one or more first marks;
        b) calculating a stroke needed for the one or more first marks;
        c) calculating a first path needed for the one or more first marks;
        d) initiating a spooler and applying the one or more first marks;
        e) identifying new user input whilst the stroke tapestry engine is executing;
        f) either:
            directly responding to the new user input by providing at least one of a requested mark, requested stroke and requested path established in dependence upon the new user input;
            or:
            calculating a partial response to the new user input by providing a modification to at least one of a subsequent mark, a stroke and the path where the modification is established in dependence upon the new user input;
        g) calculating brush parameters needed for one or more further marks in dependence upon interpolating between one or more first marks and the one or more second marks;
        h) calculating a further stroke needed for the one or more further marks in dependence upon interpolating between one or more first marks and the one or more second marks;
        i) calculating a second path needed for the one or more further marks in dependence upon interpolating between one or more first marks and the one or more second marks;
        j) initiating the spooler and apply the one or more further marks; and
        k) repeating the steps (f) to (j) until process applies the one or more second marks.

2. Computer executable instructions stored upon a non-volatile, non-transitory storage medium where the executable instructions when executed by one or more processors of a system configure the system to execute a process comprising:
    establishing in dependence upon user input a first point within a document opened upon the system and one or more stroke parameters to apply to rendering content at the first point;
    assigning the first point and one or more stroke parameters to a first brush engine;
    establishing in dependence upon further user input a second point within the document opened upon the system and one or more further stroke parameters to apply to rendering content at the second point;
    assigning the second point and one or more further stroke parameters to a second brush engine;
    establishing in dependence upon additional user input a plurality of third points within the document opened upon the system and a plurality of sets of additional stroke parameters where each set of additional stroke parameters of the plurality of sets of additional stroke parameters is associated with a predetermined third point of the plurality of third points; and assigning each third point of the plurality of third points and the set of additional stroke parameters of the plurality of sets of additional stroke parameters associated with the third point of the plurality of third points to a different brush engine;

executing a stroke tapestry engine comprising at least the first engine and second engine to generate a stroke tapestry for rendering upon a display associated with the system; wherein the stroke tapestry comprises a plurality of brush strokes automatically generated by the stroke tapestry engine along a path established between the first point and the second point;

the first point, second point and the plurality of third points comprise a total of N points;

there are N brush engines; and the plurality of brush strokes transition from one or more first marks at the first point to one or more second marks at the second point in dependence upon the one or more stroke parameters.

3. The computer executable instructions according to claim 2, wherein each of the first brush engine and second brush engine executes a process comprising:
   a) calculating brush parameters needed for one or more first marks;
   b) calculating a stroke needed for the one or more first marks;
   c) calculating a first path needed for the one or more first marks;
   d) initiating a spooler and applying the one or more first marks;
   e) calculating brush parameters needed for one or more further marks in dependence upon interpolating between one or more first marks and the one or more second marks;
   f) calculating a further stroke needed for the one or more further marks in dependence upon interpolating between one or more first marks and the one or more second marks;
   g) calculating a second path needed for the one or more further marks in dependence upon interpolating between one or more first marks and the one or more second marks;
   h) initiating the spooler and apply the one or more further marks; and
   i) repeating the steps (e) to (h) until process applies the one or more second marks.

4. The computer executable instructions according to claim 2, wherein the stroke tapestry engine executes a process comprising:
   a) calculating all brush parameters needed for all marks within the stroke tapestry;
   b) calculating all strokes needed for all marks within the stroke tapestry;
   c) calculating all paths needed for all marks within the stroke tapestry; and
   d) initiating a spooler and applying all the marks with the first brush engine and the second brush engine.

5. The computer executable instructions according to claim 2, wherein the stroke tapestry engine executes a process comprising:
   a) calculating all brush parameters needed for all marks within the stroke tapestry;
   b) calculating all strokes needed for all marks within the stroke tapestry;
   c) calculating all paths needed for all marks within the stroke tapestry; and
   d) initiating a spooler and applying all the marks with the N brush engines.

6. The computer executable instructions according to claim 2, wherein each of the first brush engine and second brush engine executes a process comprising:
   a) calculating brush parameters needed for the one or more first marks;
   b) calculating a stroke needed for the one or more first marks;
   c) calculating a first path needed for the one or more first marks;
   d) initiating a spooler and applying the one or more first marks;
   e) identifying new user input whilst the stroke tapestry engine is executing;
   f) either:
      directly responding to the new user input by providing at least one of a requested mark, requested stroke and requested path established in dependence upon the new user input;
      or:
      calculating a partial response to the new user input by providing a modification to at least one of a subsequent mark, a stroke and the path where the modification is established in dependence upon the new user input;
   g) calculating brush parameters needed for one or more further marks in dependence upon interpolating between one or more first marks and the one or more second marks;
   h) calculating a further stroke needed for the one or more further marks in dependence upon interpolating between one or more first marks and the one or more second marks;
   i) calculating a second path needed for the one or more further marks in dependence upon interpolating between one or more first marks and the one or more second marks;
   j) initiating the spooler and apply the one or more further marks; and
   k) repeating the steps (f) to (j) until process applies the one or more second marks.

7. The computer executable instructions according to claim 2, wherein each of the first brush engine and second brush engine executes a process comprising:
   a) calculating brush parameters needed for the one or more first marks;
   b) calculating a stroke needed for the one or more first marks;
   c) fetching a first path needed for the one or more first marks;
   d) initiating a spooler and applying the one or more first marks;
   e) identifying new user input whilst the stroke tapestry engine is executing;
   f) either:
      directly responding to the new user input by providing at least one of a requested mark, requested stroke and requested path established in dependence upon the new user input;
      or:
      calculating a partial response to the new user input by providing a modification to at least one of a subsequent mark, a stroke and the path where the modification is established in dependence upon the new user input;
g) calculating brush parameters needed for one or more further marks in dependence upon interpolating between one or more first marks and the one or more second marks;
h) calculating a further stroke needed for the one or more further marks in dependence upon interpolating between one or more first marks and the one or more second marks;
i) fetching a second path needed for the one or more further marks in dependence upon interpolating between one or more first marks and the one or more second marks;
j) initiating the spooler and apply the one or more further marks; and
k) repeating the steps (f) to (j) until process applies the one or more second marks; and at least one of fetching the first path and fetching the second path is established in dependence upon at least one of:
applying a pre-existing smart stroke selected by the user;
automatically applying a saliency process to the portion of the document the stroke tapestry is being applied to; and
automatically establishing the path in dependence upon processing an underlying item of content associated with that portion of the document the stroke tapestry is being applied to.

8. The computer executable instructions according to claim 2, wherein
each of the first brush engine and second brush engine executes a process comprising:
a) calculating all brush parameters needed for all marks within the stroke tapestry;
b) calculating all strokes needed for all marks within the stroke tapestry;
c) fetching all paths needed for all marks within the stroke tapestry; and
d) initiating a spooler and applying all the marks; and
fetching all paths comprises at least one of:
applying a pre-existing smart stroke selected by the user;
automatically applying a saliency process to the portion of the document the stroke tapestry is being applied to; and
automatically establishing the paths in dependence upon processing an underlying item of content associated with that portion of the document the stroke tapestry is being applied to.

9. Computer executable instructions stored upon a non-volatile, non-transitory storage medium where the executable instructions when executed by one or more processors of a system configure the system to execute a process comprising:
establishing in dependence upon user input a first point within a document opened upon the system;
establishing in dependence upon further user input a second point within the document;
establishing in dependence upon additional user input one or more stroke parameters to apply to rendering content at least one of the first point and the second point; and
executing a stroke tapestry engine to generate a stroke tapestry for rendering upon a display associated with the system; wherein the stroke tapestry comprises a plurality of brush strokes automatically generated by the stroke tapestry engine along a path established between the first point and the second point;
the plurality of brush strokes transition from one or more first marks at the first point to one or more second marks at the second point in dependence upon the one or more stroke parameters;
the stroke tapestry engine executes a process comprising:
a) calculating brush parameters needed for one or more first marks;
b) calculating a stroke needed for the one or more first marks;
c) fetching a first path needed for the one or more first marks;
d) initiating a spooler and applying the one or more first marks;
e) identifying new user input whilst the stroke tapestry engine is executing;
f) either:
directly responding to the new user input by providing at least one of a requested mark, requested stroke and requested path established in dependence upon the new user input;
or:
calculating a partial response to the new user input by providing a modification to at least one of a subsequent mark, a stroke and the path where the modification is established in dependence upon the new user input;
g) calculating brush parameters needed for one or more further marks in dependence upon interpolating between one or more first marks and the one or more second marks;
h) calculating a further stroke needed for the one or more further marks in dependence upon interpolating between one or more first marks and the one or more second marks;
i) fetching a second path needed for the one or more further marks in dependence upon interpolating between one or more first marks and the one or more second marks;
j) initiating the spooler and apply the one or more further marks; and
k) repeating the steps (f) to (j) until process applies the one or more second marks; and at least one of fetching the first path and fetching the second path is established in dependence upon at least one of:
applying a pre-existing smart stroke selected by the user;
automatically applying a saliency process to the portion of the document the stroke tapestry is being applied to; and
automatically establishing the path in dependence upon processing an underlying item of content associated with that portion of the document the stroke tapestry is being applied to.

10. Computer executable instructions stored upon a non-volatile, non-transitory storage medium where the executable instructions when executed by one or more processors of a system configure the system to execute a process comprising:
establishing in dependence upon user input a first point within a document opened upon the system;
establishing in dependence upon further user input a second point within the document;

establishing in dependence upon additional user input one or more stroke parameters to apply to rendering content at least one of the first point and the second point; and executing a stroke tapestry engine to generate a stroke tapestry for rendering upon a display associated with the system; wherein the stroke tapestry comprises a plurality of brush strokes automatically generated by the stroke tapestry engine along a path established between the first point and the second point;

the plurality of brush strokes transition from one or more first marks at the first point to one or more second marks at the second point in dependence upon the one or more stroke parameters;

the stroke tapestry engine executes a process comprising:
- a) calculating all brush parameters needed for all marks within the stroke tapestry;
- b) calculating all strokes needed for all marks within the stroke tapestry;
- c) fetching all paths needed for all marks within the stroke tapestry; and
- d) initiating a spooler and applying all the marks; and fetching all paths comprises at least one of:
- applying a pre-existing smart stroke selected by the user;
- automatically applying a saliency process to the portion of the document the stroke tapestry is being applied to; and
- automatically establishing the paths in dependence upon processing an underlying item of content associated with that portion of the document the stroke tapestry is being applied to.

* * * * *